(12) United States Patent
Hori et al.

(10) Patent No.: US 11,647,428 B2
(45) Date of Patent: *May 9, 2023

(54) COMMUNICATION TERMINAL APPARATUS AND COMMUNICATION METHOD

(71) Applicant: PANASONIC INTELLECTUAL PROPERTY CORPORATION OF AMERICA, Torrance, CA (US)

(72) Inventors: Takako Hori, Kanagawa (JP); Hiroyuki Ehara, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 448 days.

This patent is subject to a terminal disclaimer.

(21) Appl. No.: 17/069,499

(22) Filed: Oct. 13, 2020

(65) Prior Publication Data

US 2021/0029595 A1 Jan. 28, 2021

Related U.S. Application Data

(63) Continuation of application No. 15/014,405, filed on Feb. 3, 2016, now Pat. No. 10,841,842, which is a
(Continued)

(30) Foreign Application Priority Data

| Jun. 9, 2011 | (JP) | 2011-129422 |
| Nov. 11, 2011 | (JP) | 2011-247330 |
| Feb. 15, 2012 | (JP) | 2012-030419 |

(51) Int. Cl.
*H04W 36/00* (2009.01)
*H04W 88/18* (2009.01)
(Continued)

(52) U.S. Cl.
CPC ....... *H04W 36/0022* (2013.01); *H04W 72/04* (2013.01); *H04W 76/22* (2018.02); *H04M 7/0072* (2013.01); *H04W 88/181* (2013.01)

(58) Field of Classification Search
CPC . H04W 36/0022; H04W 72/04; H04W 76/22; H04W 88/181; H04W 36/14; H04M 7/0072
See application file for complete search history.

(56) References Cited

U.S. PATENT DOCUMENTS

| 7,593,325 | B1 | 9/2009 | Croak et al. |
| 9,479,967 | B1 * | 10/2016 | Smith ................. H04W 88/181 |

(Continued)

FOREIGN PATENT DOCUMENTS

| CN | 1554054 | 12/2004 |
| CN | 102017784 | 4/2011 |

(Continued)

OTHER PUBLICATIONS

"IP Multimedia Subsystem (IMS) centralized services", Stage 2 (Release 10), 3GPP TS 23.292 V10.3.0 (Mar. 2011).

(Continued)

*Primary Examiner* — Michael Thier
*Assistant Examiner* — Jose L Perez
(74) *Attorney, Agent, or Firm* — Greenblum & Bernstein, P.L.C.

(57) ABSTRACT

A communication method supports Enhanced Voice Services (EVS) codec performed by a communication terminal apparatus. The method includes performing negotiation to use an EVS codec for communication between a communication terminal apparatus and a counterpart terminal, using an IP multimedia subsystem (IMS) signaling including one of a session description protocol (SDP) offer and an SDP answer, and performing negotiation to specify one or more (Continued)

audio-bandwidths of input signals in Hertz (Hz) or kilohertz (kHz) for the EVS codec. In a communication session after the codec negotiation session, the processor causes the receiver to receive a signaling for changing an audio-bandwidth of an input signal to the EVS codec from a network node, changes the audio-bandwidth of the input signal to the EVS codec to another audio-bandwidth without changing the EVS codec based on the signaling, and causes the transmitter to transmit encoded data in the changed audio-bandwidth.

12 Claims, 21 Drawing Sheets

Related U.S. Application Data continuation of application No. 14/123,333, filed as application No. PCT/JP2012/003410 on May 25, 2012, now Pat. No. 9,288,792.

(51) Int. Cl.
  *H04M 7/00* (2006.01)
  *H04W 76/22* (2018.01)
  *H04W 72/04* (2023.01)

(56) References Cited

U.S. PATENT DOCUMENTS

| | | | |
|---|---|---|---|
| 2002/0150228 | A1 | 10/2002 | Umeda et al. |
| 2002/0163908 | A1 | 11/2002 | Lakaniemi et al. |
| 2003/0028643 | A1 | 2/2003 | Jabri |
| 2003/0032440 | A1 | 2/2003 | Sato et al. |
| 2003/0063569 | A1 | 4/2003 | Kalliokulju et al. |
| 2004/0057420 | A1 | 3/2004 | Curcio et al. |
| 2005/0228651 | A1 | 10/2005 | Wang et al. |
| 2005/0246164 | A1 | 11/2005 | Ojala et al. |
| 2005/0261900 | A1 | 11/2005 | Ojala et al. |
| 2006/0034260 | A1* | 2/2006 | Svedberg .............. H04W 76/45 370/352 |
| 2006/0230169 | A1 | 10/2006 | Kaplan et al. |
| 2006/0251093 | A1 | 11/2006 | Curcio et al. |
| 2008/0081648 | A1 | 4/2008 | Kang et al. |
| 2009/0290573 | A1 | 11/2009 | Belling et al. |
| 2010/0004014 | A1 | 1/2010 | Coulombe |
| 2010/0017509 | A1 | 1/2010 | Frankkila et al. |
| 2010/0154029 | A1 | 6/2010 | Fernandez Alonso et al. |
| 2010/0195521 | A1 | 8/2010 | Wanstedt et al. |
| 2010/0198980 | A1 | 8/2010 | Astrom et al. |
| 2010/0211666 | A1 | 8/2010 | Kvernvik et al. |
| 2010/0272072 | A1* | 10/2010 | Bienn ................ H04M 7/0072 370/335 |
| 2010/0284278 | A1 | 11/2010 | Alanara |
| 2010/0318670 | A1 | 12/2010 | Al-Shalash et al. |
| 2011/0022722 | A1 | 1/2011 | Castellanos Zamora et al. |
| 2011/0051691 | A1 | 3/2011 | Hietalahti et al. |
| 2012/0044867 | A1 | 2/2012 | Faccin et al. |
| 2012/0101813 | A1 | 4/2012 | Vaillancourt et al. |
| 2012/0106451 | A1 | 5/2012 | Enstrom et al. |
| 2012/0265523 | A1 | 10/2012 | Greer et al. |
| 2013/0198397 | A1 | 8/2013 | Zhang et al. |
| 2013/0346073 | A1 | 12/2013 | Laaksonen et al. |

FOREIGN PATENT DOCUMENTS

| | | |
|---|---|---|
| JP | 2006-500808 | 1/2006 |
| JP | 2007-532963 | 11/2007 |
| JP | 2009-512379 | 3/2009 |
| WO | 2002/015630 | 2/2002 |
| WO | 2009/100979 | 8/2009 |

OTHER PUBLICATIONS

"Feasibility Study of Single Radio Voice Call Continuity (SRVCC) from UTRAN/GERAN to E-UTRAN/HSPA", Stage 2 (Release 10), 3GPP TR 23.885 V1.2.0 (Mar. 2011).
"IP Multimedia Subsystem (IMS); Multimedia Telephony; Media handling and interaction", (Release 10), 3GPP TS 26.114 V10.0.0 (Mar. 2011).
"EVS Permanent Document #4 (EVS-4): EVS design constraints", Version 0.7.0, Agenda Item 11.1, 3GPP TSG-SA4#64, Apr. 11-15, 2011.
Nishida et al., "Proposal on an Improvement of the IMS-Circuit Switch Voice Call Continuity", IEICE Technical Report, NS2010-178 (Mar. 2011).
Koshimizu et al., "Audio Video Call Application of Single Radio Voice Call Continuity", IEICE, (Mar. 2011).
"RTP Payload Format and File Storage Format for the Adaptive Multy-Rate (AMR) and Adaptive Multi-Rate Wideband (AMR-WB) Audio Codecs", RFC 4867, Apr. 2007.
"IP Multimedia Subsystem (IMS) Service Continuity", Stage 2 (Release 11), 3GPP TS 23.237 V11.0.0 (Mar. 2011).
"Single Radio Voice Call Continuity (SRVCC)", Stage 2 (Release 9), 3GPP TS 23.216 V9.6.0 (Dec. 2010).
International Search Report, dated Jun. 19, 2012, in corresponding International Application No. PCT/JP2012/003410.
Chinese Search Report (English language translation) provided as an annex to the Chinese Office Action, dated Apr. 22, 2016, in the corresponding Chinese Patent Application No. 201280024440.X.
Extended European Search Report, dated Jan. 20, 2017 by the European Patent Office (EPO), in the corresponding European Patent Application No. 16193870.9.
ETSI. TR 126 976 "Performance characterization of the Adaptive Muiti-Rate Wideband (AMR-WB) speech codec" Apr. 2011, V10. 0.0, p. 53 (Year: 2011).
Pobloth. S4-110539, EVS Permanent Documents (EVS-4): EVS design constraints. Apr. 11-15, 2011,3GPP TSG-SA4#64, whole document (Year: 2011).
Schulzrinne et al., RFC 3550, RTP: A Transport Protocol for Real-Time Applications, RFC 3550, Jul. 2003, pp. 1,5 (Year: 2003).
Okumura et al., SIP (Session Initiation Protocol) Usage of the Offer/Answer Model, draft-ietf-sipping-sip-offeranswer-1, Jun. 6, 2011, internet-Draft, pp. 1,4, 7-8 (Year: 2011).
Faccin at al., U.S. Appl. No. 61/374,869 of US 2012/0044867 A1, Aug. 18, 2010, whole document.
Rosenberg et al., (RFC 3264, An Offer/Answer Model with the Session Description Protocol (SOP)), Jun. 2002, pp. 1, 7, 11.

* cited by examiner

COMMUNICATION TERMINAL APPARATUS AND COMMUNICATION METHOD

CROSS REFERENCE TO RELATED APPLICATIONS

This application is a continuation of U.S. application Ser. No. 15/014,405 filed Feb. 3, 2016, which is a continuation of U.S. application Ser. No. 14/123,333, filed Dec. 2, 2013 and now U.S. Pat. No. 9,288,792 issued Mar. 15, 2016, which is a National Stage application of International Patent Application No. PCT/JP2012/003410, filed May 25, 2012, which claims priority to Japanese Application Nos. 2011-129422, filed Jun. 9, 2011, 2011-247330, filed Nov. 11, 2011, and 2012-030419 filed Feb. 15, 2012. The entire disclosure of each of the above-identified documents, including the specification, drawings, and claims, is incorporated herein by reference in its entirety.

TECHNICAL FIELD

The present invention relates to a network node, a terminal, a bandwidth change determination method and a bandwidth change method for changing a codec used in a mobile communication technology.

BACKGROUND ART

In the related art, voice calls in a mobile communication technology of the third generation partnership project (3GPP) are made using a 3GPP circuit switching (CS) network. In recent years, a voice over long term evolution (VoLTE) service which is a voice call that uses a 3GPP packet switching (PS) network has been started.

However, an area where the VoLTE service is available is limited for a while. For this reason, when a user moves out of the VoLTE service area during a voice call based on VoLTE (hereinafter, refer to as VoLTE call), it is necessary to switch this call to a call based on a circuit switching technique in the related art. As a technique that enables this switching, there is single radio voice call continuity (SRVCC) disclosed in Non-Patent Literature (hereinafter, abbreviated as "NPL") 1. Hereinafter, a handover operation based on SRVCC will be described with reference to FIGS. 1 and 2.

FIG. 1 is a diagram illustrating a part of a configuration of a 3GPP mobile communication network. A mobile communication network shown in FIG. 1 is configured by an evolved universal terrestrial radio access network (e-UTRAN), an e-UTRAN base station (e-nodeB), a PS network, a CS network, a base station subsystem of the CS network, and an IP multimedia Subsystem (IMS).

Specifically, in FIG. 1, e-UTRAN is a radio access network that is capable of providing the VoLTE service. The PS network provides the VoLTE service and includes a packet data network gateway (P-GW), a serving gateway (S-GW), and a mobility management entity (MME). The CS network includes a mobile switching center (MSC), and a media gateway (MGW). The base station subsystem of the CS network includes a radio network controller (RNC), and nodeB. IMS performs a call control or the like, and includes a call session control function (CSCF), and a service centraliatin and continuity application server (SCC AS).

In FIG. 1, it is assumed that UE 100 and UB 102 that are mobile communication terminals (user equipment) are initially connected to the PS network, respectively (here, a radio access network, a base station and a PS network on the side of UE 102 are not shown). That is, it is assumed that a VoLTE call is made between UE 100 and UE 102. Hare, it is assumed that UB 100 is handed over (HO) to the CS network during the call.

Path A, Path B and Path C indicated by solid lines FIG. 1 represent paths through which speech data passes. Further, reference numerals 200, 202, 204 and 206 indicated by dashed lines in FIG. 1 represent paths through which signals pass in an SRVCC handover process.

FIG. 2 is a sequence chart illustrating an operation of the SRVCC handover process. UB 100 and UE 102 are initially connected to the PS network (e-UTRAN), respectively, and the speech data between UE 100 and UE 102 is transmitted and received through Path A. If UE 100 is distant from a cover area of the e-UTRAN, e-nodeB detects the fact, and exchanges signaling with RNC/nodeB through MME and MSC/MGW (signaling 200 shown in FIG. 1 and step (hereinafter, referred to as "ST") 200 shown in FIG. 2). In ST200, a data path in the CS network is prepared between nodeB and MSC/MGW. If the preparation is finished, a command for handover to UTRAN (CS network) is given to UE 100 from MME through e-nodeB.

At the same time with the process of ST200, MSC/MGW exchanges signaling with UE 102 through CSCF/SCC AS (signaling 202 shown in FIG. 1 and ST202 shown in FIG. 2). Thus, a command is given for switching a transmission/reception destination of speech data of UE 102 from UE 100 to MSC/MGW, and Path B is established.

After handover to UTRAN, UE 100 exchanges signaling with MSC/MGW through RNC/nodeB (signaling 204 shown in FIG. 1 and ST204 shown in FIG. 2). Thus, Path C is established.

After establishment of Path C, MSC/MGW exchanges signaling with P-GW/S-GW through MME (signaling 206 shown in FIG. 1 and ST206 shown in FIG. 2). Thus, Path A is deleted.

Hereinbefore, the operation of SRVCC handover has been described.

Further, as a technique that improves SRVCC to reduce the time necessary for switching data paths, there is an SRVCC method (eSRVCC: enhanced-SRVCC) that uses access transfer control function (ATCF) enhancement, as disclosed in NPL 3. An example of an operation of eSRVCC will be described with reference to FIGS. 3 and 4.

FIG. 3 shows a part of a configuration of a 3GPP mobile communication network that enables eSRVCC. The mobile communication network shown in FIG. 3 includes e-UTRAN, e-nodeB, a PS network, a CS network, a base station subsystem of the CS network, and IMS, similarly to FIG. 1. Here, an access transfer control function (ATCF) and an access transfer gateway (ATGW), in addition to CSCF and SCC AS, are present in IMS. In FIGS. 3 and 4, ATCF and ATGW are represented as one node (ATCF/ATGW 1120), but may be provided as separate nodes.

In FIG. 3, UE 100 and UE 102 are initially connected to the PS network, respectively (here, a wireless access network, a base station and the PS network on the side of UE 102 are not shown). That is, it is assumed that a VoLTE call is performed between UE 100 and UE 102. Here, it is assumed that UE 100 is handed over to the CS network during a call.

Path A, Path B, Path C and Path D indicated by solid lines in FIG. 3 represent paths through which speech data passes. Further, reference numerals 1100, 1102, 1104 and 1106 indicated by dashed lines in FIG. 3 represent paths through which signals in an eSRVCC handover process pass.

FIG. 4 is a sequence chart illustrating an operation of eSRVCC handover. UE 100 and UE 102 are initially connected to the PS network (e-UTRAN), respectively. In a system in which the eSRVCC handover is realized, in ATC/ATGW 1120, ATCF anchors signaling of IMS (M signaling), and ATGW anchors the speech data. That is, when a call between UE 100 and UE 102 starts, the IMS signaling for the call start is relayed by ATCF, and in a case where ATCF determines that anchoring of the speech data in ATGW is necessary, ATGW is allocated as an anchor point of the speech data. Thus, the speech data between UE 100 and UE 102 is transmitted and received through Path A and Path B.

If UE 100 is distant from a cover area of e-UTRAN, e-nodeB detects the fac and exchanges signaling with RNC/nodeB through MME and MSC/MGW (signaling 1100 shown in FIG. 3 and ST1100 shown in FIG. 4). In ST1100, a data path in the CS network is prepared between nodeB and MSC/MGW. If the preparation is finished, a command for handover to UTRAN (CS network) is given to UE 100 from MME through e-nodeB.

At the same time with the process of ST1100, MSC/MGW transmits signaling to ATCF. Thus, a command for path switching is given to ATGW from ATCF, and a transmission/reception destination of speech data of ATGW is switched from UE 100 to MSC/MGW (signaling 1102 shown in FIG. 3 and ST1102 shown in FIG. 4). That is, Path C is established. Further, if the path switching process to ATGW is finished, ATCF transmits notification signaling to SCC-AS (signaling 1102 shown in FIG. 3 and ST1102 shown in FIG. 4).

After handover to UTRAN, UE 100 exchanges signaling with MSC/MGW through RNC/nodeB (signaling 1104 shown in FIG. 3 and ST1104 shown in FIG. 4). Thus, Path D is established.

After establishment of Path D, MSC/MGW exchanges signaling with P-GW/S-GW through MME (signaling 1106 shown in FIG. 3 and ST1106 shown in FIG. 4). Thus, Path B is deleted.

Hereinbefore, the operation of eSRVCC handover has been described.

As a voice codec used in the CS network, an adaptive multi-rate (AMR) codec that is a narrowband (NB) codec, an AMR-WB codec that is a wideband (WB) codec, or the like is widely used. AMR and AMR-WB is usable in a packet exchanging technique, and thus, may also be considered to be used in the PS network (VoLTE).

AMR and AMR-WB have supported bitrates that are different from each other. Further, in a case where AMR and AMR-WB are used in the PS network, frame type indexes for bit rates used in a real-time transport protocol (RTP) payload format as disclosed in NPL 2 overlap with each other. Thus, when in use either in the CS network or in the PS network, it is necessary to determine whether to use AMR or AMR-WB at the start of session. That is, it is difficult to exchange AMR and AMR-WB without re-negotiation of the session.

In the related art, the narrowband codec generally refers to a codec with a bandwidth of 300 Hz to 3.4 kHz, sampled at 8 kHz. Further, the wideband codec refers to a codec with a bandwidth of 50 Hz to 7 kHz, sampled at 16 kHz. Further, a super wideband (SWB) codec refers to a codec with a bandwidth of 50 Hz to 14 kHz, sampled at 32 kHz.

CITATION LIST

Non Patent Literature

NPL 1
3GPP TS23.216 v9.6.0 "Single Radio Voice Call Continuity (SRVCC)" NPL 2
IETF RFC 4867, "RTP Payload Format and File Storage Format for the Adaptive Multi-Rate (AMR) and Adaptive Multi-Rate Wideband (AMR-WB) Audio Codecs"
NPL 3
3GPP TS23.237 v11.0.0 "IP Multimedia Subsystem (IMS) Service Continuity"
NPL 4
Takashi Koshimizu and Katsutoshi Noshida, "Audio Video Calloff Single Radio Voice Call Continuity", General meeting of the Institute of Electronics, Information and Communication Engineers in 2011, B-6-77
NPL 5
Katsutoshi Nishida and Takeshi Koshimizu, "Proposal on an Improvement of the IMS-Circuit Switch Voice Call Continuity: Local Anchoring SRVCC based on the Terminal Capability", IEICE technical report NS2010-178, pp 85-90

SUMMARY OF INVENTION

Technical Problem

In FIG. 1 or FIG. 3, when UE 100 is handed over from the PS network to the CS network, in a case where the codec used in the PS network is not supported in the CS network, the codec used by UE 100 is changed to a codec supported by the CS network. In a case where change of the codec occurs in UE 100, in order to enable call continuity between UE 100 and UE 102, the following two methods may be considered. The first method is a method of changing the codec used by UE 102 to the same codec as the changed codec of UE 100. The second method is a method of performing transcoding in MSC/MGW.

In the former method, it takes time for signaling for change of the codec of UE 102 and the disconnection time of a call is prolonged, which is not preferable. Further, in the eSRVCC handover, since signaling for path switching in handover of UE 100 is terminated in ATCF, it is difficult to transmit signaling for changing the codec of UE 102. That is, in the eSRVCC handover, it is difficult to change the codec of UE 102 using the existing signaling.

Accordingly, it is considered that the latter transcoding method is relatively preferable. However, in performing the transcoding, in a case where codec bandwidths (bandwidths of input and output signals of codecs) are different from each other, in particular, when transcoding is performed to a narrow bandwidth codec from a wide bandwidth codec, speech quality is degraded.

An object of the invention is to provide a network node, a terminal, a bandwidth change determination method and a bandwidth change method capable of suppressing degradation of speech quality due to transcoding, without disconnection of a call, even in a case where a codec used by one of terminals in communication is changed.

Solution to Problem

A network node according to an aspect of the present invention is a network node that performs transcoding for communication between two terminals that use different codecs, the network node including: a detection section that detects the codecs respectively used by the two terminals; a determination section that, when detecting a change of the codec used by one of the two terminals based on a detection result in the detection section, determines, using a first codec of the other one of the two terminals and a second codec of the one of the two terminals which has been changed, whether to limit a first bandwidth of the first codec; and a transmission section that transmits, to the other one of the two terminals, signaling for limiting the first bandwidth in a case where it is determined to limit the first bandwidth in the determination section.

A terminal according to an aspect of the present invention is a terminal used in a communication system in which transcoding is performed by a network node for communication between terminals that use different codecs, the network node being positioned between the terminals, the terminal including: a negotiation section that negotiates a first codec used for communication between the terminal and a counterpart terminal that is a communication counterpart of the terminal; a determination section that determines a first bandwidth of an input signal to be encoded in the terminal, with respect to the negotiated first codec; and a change section that controls a change of the first bandwidth determined by the determination section, according to signaling for limiting the first bandwidth, the signaling being notified from the network node.

A bandwidth change determination method according to an aspect of the present invention is a method in a network node that performs transcoding for communication between two terminals that use different codecs, the method including: detecting the codecs respectively used by the two terminals; determining, when detecting a change of the codec used by one of the two terminals based on a detection result, using a first codec of the other one of the two terminals and a second codec of the one of the two terminals which has been changed, whether to limit a first bandwidth of the first codec; and transmitting, to the other one of the two terminals, signaling for limiting the first bandwidth in a case where it is determined to limit the first bandwidth.

A bandwidth change method according to an aspect of the present invention is a method in a terminal used in a communication system in which transcoding is performed by a network node for communication between terminals that use different codecs, the network node being positioned between the terminals, the method including: negotiating a first codec used for communication between the terminal and a counterpart terminal that is a communication counterpart of the terminal; selecting a first bandwidth of an input signal to be encoded in the terminal, with respect to the negotiated first codec; controlling a change of the first bandwidth according to signaling for limiting the first bandwidth, the signaling being notified from the network node; and determining the first bandwidth according to the control of a change of the first bandwidth.

Advantageous Effects of Invention

According to the present invention, even in a case where a codec used by one of terminals in communication is changed, it is possible to suppress degradation of speech quality due to transcoding, without disconnection of the call.

DESCRIPTION OF EMBODIMENTS

Embodiments of the present invention will be described in detail with reference to the accompanying drawings.

In the following description, a "bandwidth" refers to a bandwidth of an input/output signal to a codec.

Further, in the following description, a "codec in which bandwidth designation is not always necessary" refers to a codec that can switch the bandwidth of an input signal to be encoded without renegotiation of a session. For example, an incompatible mode of an EVS (Enhanced Voice Services) codec is used only on a PS network, and a supported bit rate is common to any bandwidth (see [3GPP TSG SA WG4 S4-110539 "VS Permanent Document #4 (EVS-4): EVS design constraints"]). Therefore, in the incompatible mode of the EVS codec, if the bandwidth is lower than the Nyquist frequency (½ of a sampling frequency), it is possible to perform design for freely changing the bandwidth of the input signal to be encoded even during the session. Accordingly, it is not always necessary to designate the bandwidth from the beginning to the end of the session. In this case, an encoder sets or changes the bandwidth of the input signal to be encoded, for example, according to a characteristic of the input signal (a frequency characteristic of the input signal, parameters obtained by analyzing the input signal, and the like, for example) or according to an encoding bit rate.

Embodiment 1

Figure 1:
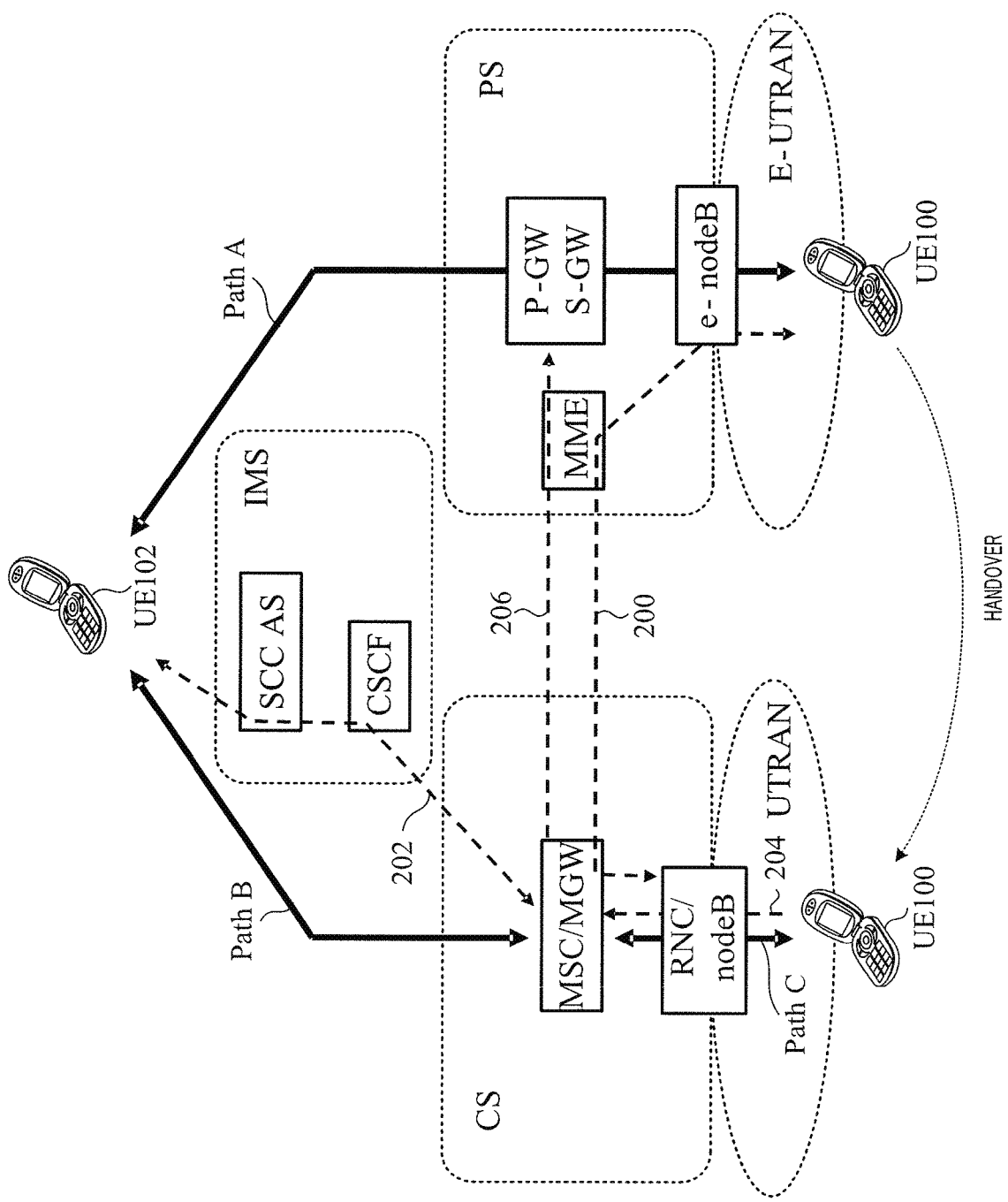
FIG. 1 is a configuration diagram illustrating a part of a 3GPP mobile communication network.
Figure 5:
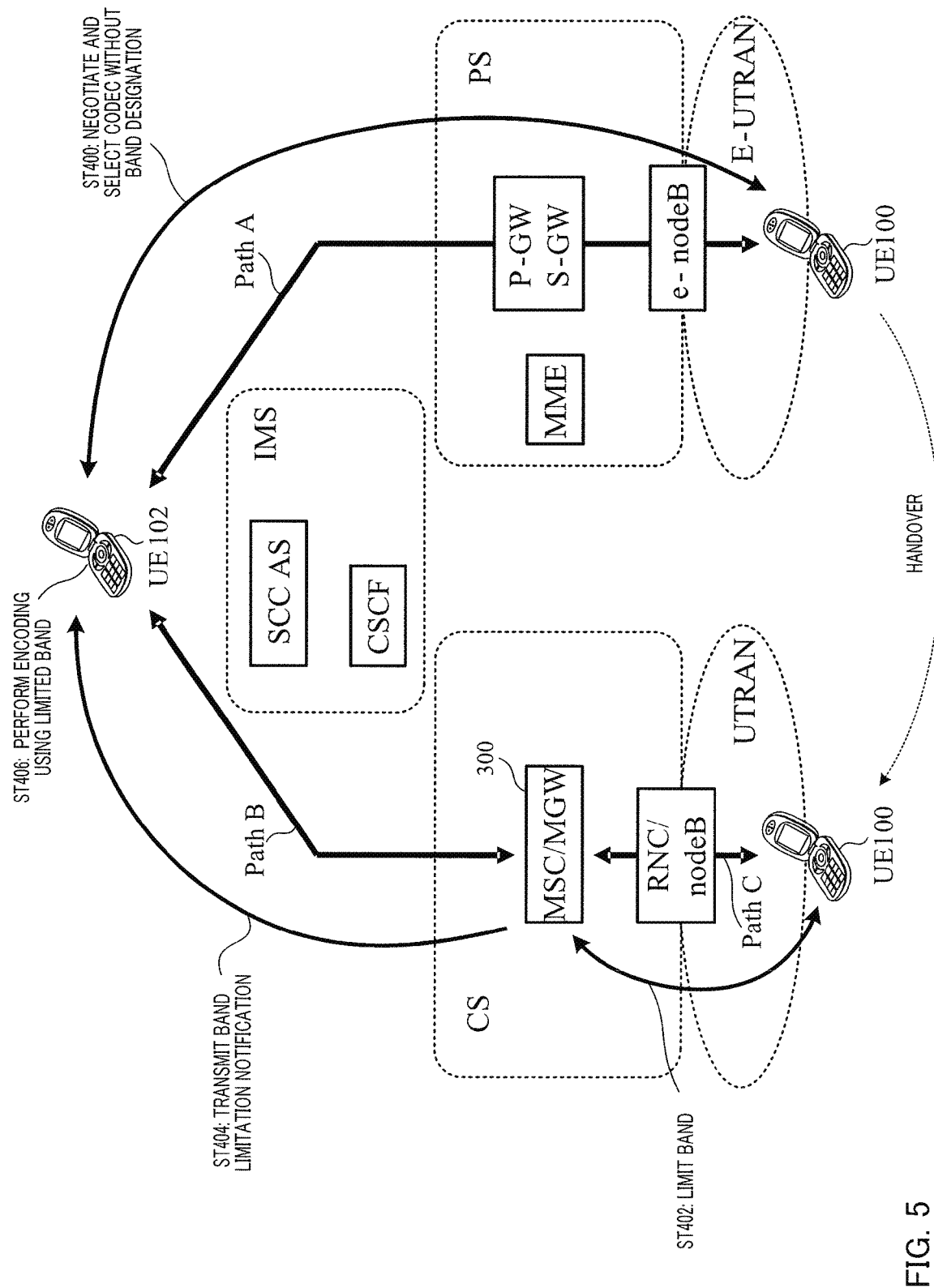
FIG. 5 is a configuration diagram illustrating a part of a mobile communication network according to Embodiment 1 of the present invention.

FIG. 5 is a diagram illustrating a configuration of a part of a mobile communication network according to Embodiment 1 of the present invention. In FIG. 5, the same reference numerals are given to the same components as in FIG. 1, and description thereof will not be shown. In FIG. 5, as compared with FIG. 1, operations of UEs 100 and 102 and MSC/MGW 300 are different.

First, MSC/MGW 300 shown in FIG. 5 will be described. MSC/MGW 300 performs transcoding for communication between two terminals that use different codecs.

Figure 6:
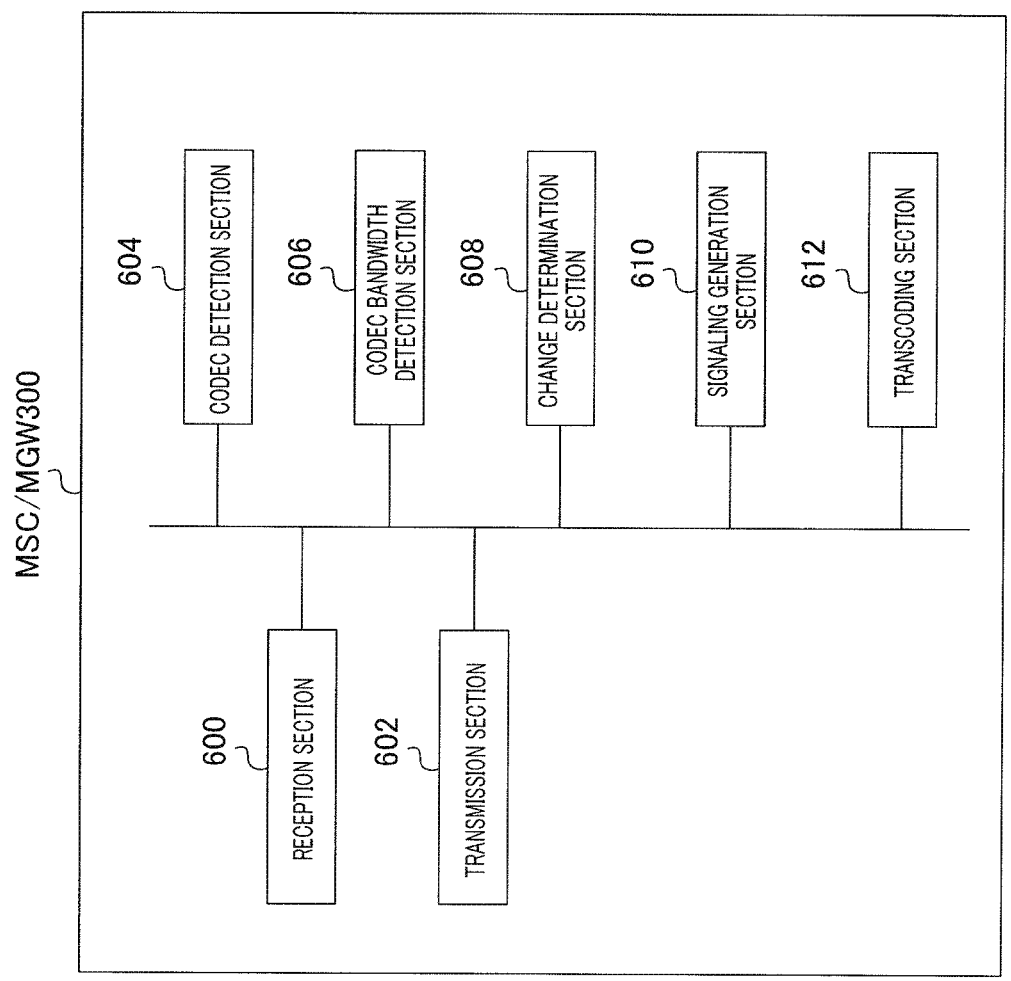
FIG. 6 is a block diagram illustrating a configuration of a network node (MSC/MGW) according to Embodiment 1 of the present invention.

FIG. 6 is a block diagram illustrating a configuration of MSC/MGW 300 (network node) according to the present embodiment. For ease of description, FIG. 6 shows a main configuration section (a configuration section relating to ST402 to ST406 (to be described later) shown in FIG. 5, for example) relating to a band limitation (band change) process that is closely related to the present invention.

In MSC/MGW 300 shown in FIG. 6, reception section 600 receives speech data (hereinafter, referred to as communication data), signaling or the like. For example, when receiving signaling (for example, signaling 202 or signaling 204 shown in FIG. 1) that is transmitted from each of UE 100 and UE 102, reception section 600 outputs the received signaling to codec detection section 604 and codec bandwidth detection section 606.

Transmission section 602 transmits communication data, signaling and the like. For example, transmission section 602 notifies UE 102 of signaling output from signaling generation section 610.

On the basis of signaling, communication data and the like from UB 100 and UE 102, input through reception section 600, codec detection section 604 detects the codecs that are used by UB 100 and UE 102, respectively. Further, codec detection section 604 outputs information (detection result) that indicates the detected codecs to change determination section 608.

On the basis of signaling, communication data and the like from UE 100 and UE 102, input through reception section 600, codec bandwidth detection section 606 detects bandwidths of the codecs that are used by UE 100 and UE 102, respectively. Further, codec bandwidth detection section 606 outputs information (detection result) that indicates the detected bandwidth codecs to change determination section 608.

On the basis of the codecs indicated by the information input from codec detection section 604 and the bandwidths of the codecs indicated by the information input from codec bandwidth detection section 606, change determination section 608 determines whether bandwidth limitation of the input signal to be encoded to UE 102 is possible, and whether the bandwidth limitation is necessary. For example, in a case where a change of the codec used by one UE 100 among two terminals (UE 100 and UE 102) is detected, change determination section 608 determines whether to limit the bandwidth of the codec of UE 102 using the codec of UE 102 and the changed codec of UE 100 on the basis of the detection result in codec detection section 604. Change determination section 608 outputs the determination result to signaling generation section 610. Further, details of the bandwidth change determination process in change determination section 608 will be described her.

In a case where it is determined by change determination section 608 that the bandwidth limitation of the input signal to be encoded to UB 102 is possible and the bandwidth limitation is necessary, signaling generation section 610 generates a signaling for requesting the UE 102 to limit the bandwidth of the input signal to be encoded in UE 102. The signaling for requesting the bandwidth limitation may include information that indicates the changed bandwidth of UE 100, for example Signaling generation section 610 transmits the generated signaling to UE 102 through transmission section 602. In this manner, if it is determined to limit the bandwidth of the codec of UE 102 in change determination section 608, signaling for limiting the bandwidth is transmitted to UE 102 through transmission section 602.

When UE 100 and UE 102 use different codecs respectively, transcoding section 612 performs transcoding for communication data to UE 102 from UE 100 and communication data to UE 100 from UE 102.

Next, with reference to FIG. 7, details of the bandwidth change determination process in change determination section 608 of MSC/MGW 300 will be described.

Figure 7:
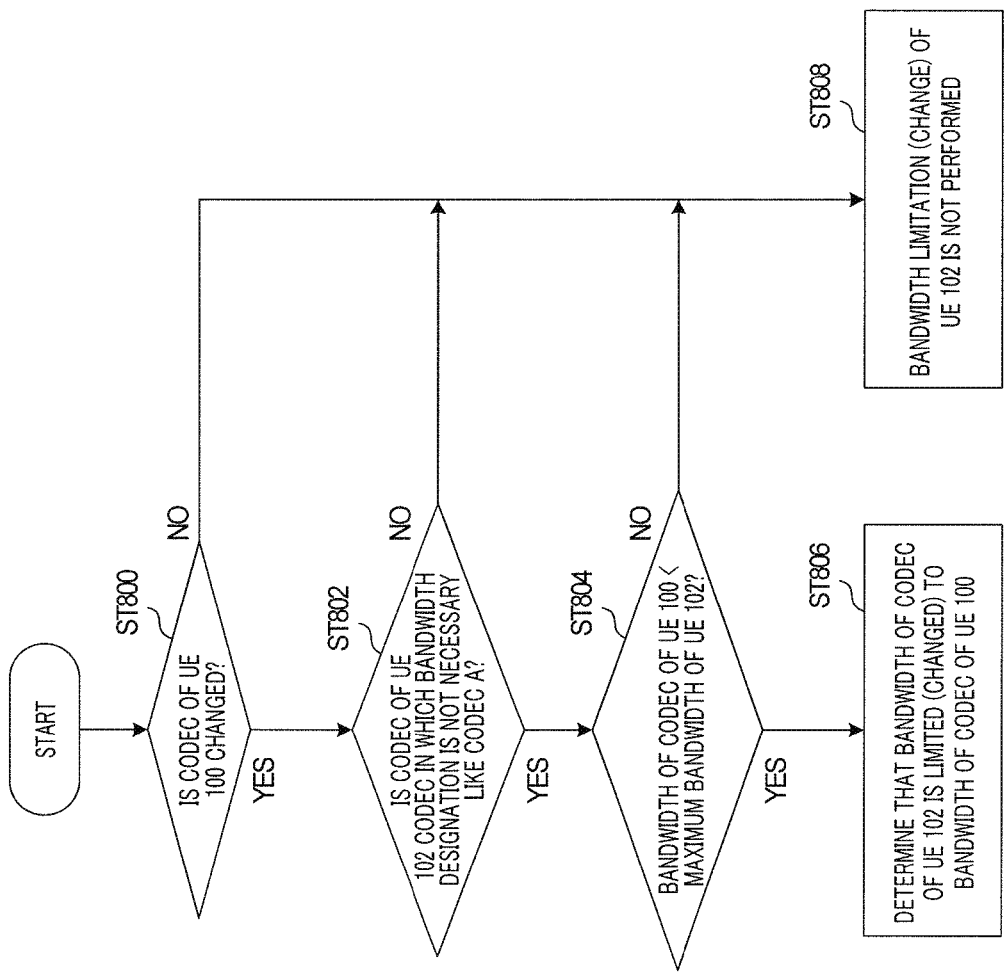
FIG. 7 is a flowchart illustrating an example of a determination method in a change determination section of the MSC/MGW according to Embodiment 1 of the present invention.

In ST800 shown in FIG. 7, change determination section 608 determines whether the codec of UE 100 is changed on the basis of the detection result (detected codec) in codec detection section 604.

If the codec of UE 100 is changed (ST 800: Yes), in ST802, change determination unit 608 determines whether the codec used by UE 102 is a code in which bandwidth designation is not necessary, such as codec A, on the basis of the detection result in codec detection section 604.

If the codec used by UE 102 is the codec in which the bandwidth designation is not necessary (ST802: Yes), in ST804, change determination section 608 determines whether the bandwidth of the changed codec of UE 100 is narrower than the maximum bandwidth of the codec that is currently used by UE 102 on the basis of the detection result in codec bandwidth detection section 606.

If the bandwidth of the changed codec of UE 100 is narrower than the maximum bandwidth of the codec that is currently used by UE 102 (ST804: Yes), in ST806, change determination section 608 determines that the bandwidth limitation (change) of the input signal to be encoded to UE 102 is possible and necessary. For example, change determination section 608 determines to limit the bandwidth of the codec of UE 102 to the bandwidth of the changed codec of UE 100.

On the other hand, if the codec of UE 100 is not changed (ST800: No), if the codec that is used by UE 102 is not the codec in which the bandwidth designation is not necessary (ST802: No), or if the band width of the changed codec of UE 100 is equal to wider than the maximum bandwidth of the codec that is currently used by UE 102 (ST804: No), in ST808, change determination section 608 determines not to perform the band limitation to UE 102.

In this manner, specifically, in a case where the change of the codec in one UE is detected, MSC/MGW 300 determines whether the code of the other UE is the codec in which the bandwidth designation is not necessary, and determines whether the bandwidth limitation (change) of the codec of the other UE is possible. Further, by determining whether the bandwidth of the changed codec of one UE is narrower than the maximum bandwidth of the codec of the other UE, MSC/MGW 300 determines whether the bandwidth limitation (change) of the codec of the other UE is necessary.

Next, UE 100 and UE 102 shown in FIG. 5 will be described.

Figure 8:
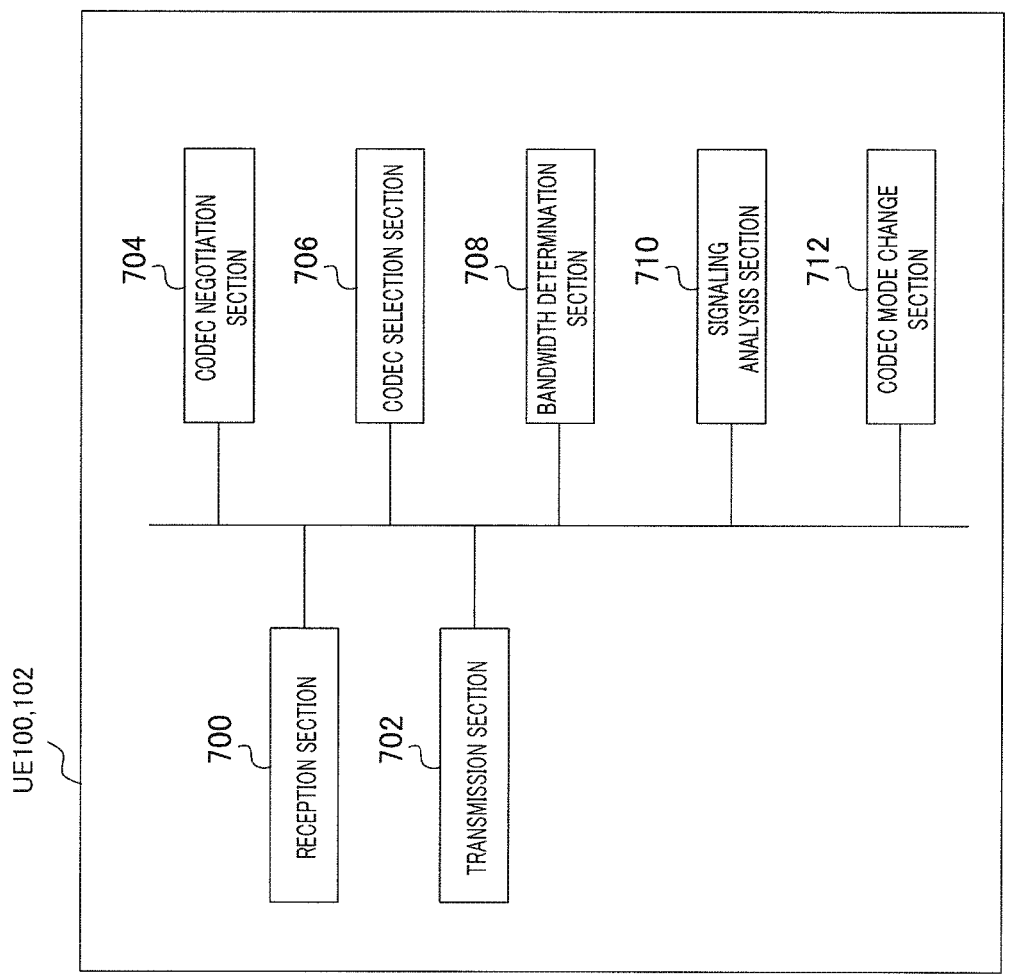
FIG. 8 is a block diagram illustrating a configuration of a terminal (UE) according to Embodiment 1 of the present invention.

FIG. 8 is a block diagram illustrating a configuration of UE 100 and UE 102 (terminals) according to the present embodiment. For ease of description, FIG. 8 shows a main configuration section (a configuration section relating to ST400 to ST406 (to be described later) shown in FIG. 5, for example) relating to a band limitation process that is closely related to the present invention.

In UE 100 and UE 102 shown in FIG. 8, reception section 700 receives communication data, signals or the like. For example, when receiving signaling (for example, signaling 202 or 204 shown in FIG. 1) that is transmitted from MSC/MGW 300, reception section 700 outputs the received signaling to codec negotiation section 704 and signaling analysis section 710.

Transmission section 702 transmits communication data, signaling (for example, signaling 202 or 204 in FIG. 1) or the like.

Codec negotiation section 704 negotiates the codec to be used in communication between terminals (here, UE 100 and UE 102). Specifically, codec negotiation section 704 creates a session description protocol (SDP) offer and an SDP answer to perform the codec negotiation. Further, when a UE (UE 100 in FIG. 5) moves to a CS network, codec negotiation section 704 of the UE performs the coding negotiation on the basis of the negotiation method in the CS network. Codec negotiation section 704 outputs the result of the coding negotiation to the codec selection section 706.

Figure 9:
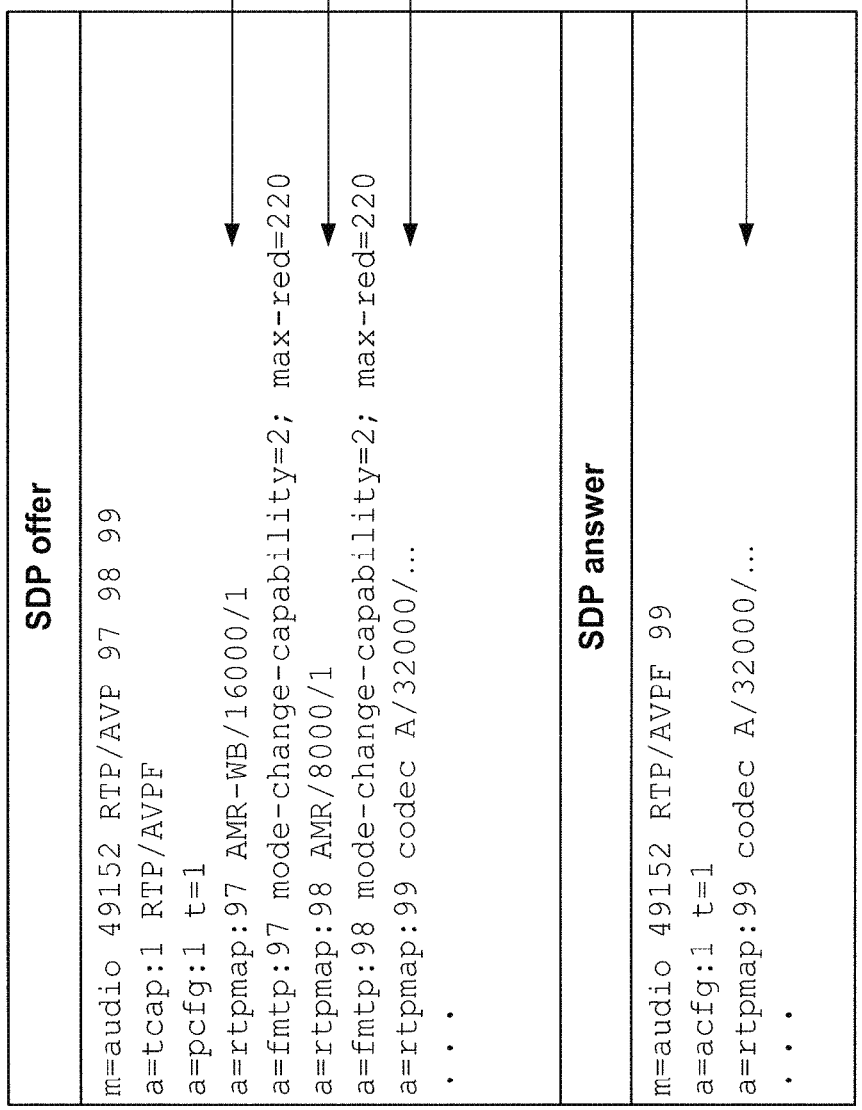
FIG. 9 is a diagram illustrating an example of SDP used in codec negotiation according to Embodiment 1 of the present invention.

FIG. 9 shows an example of the SDP used in the coding negotiation according to the present embodiment. In a case where a calling party UE supports the codec in which bandwidth designation is not always necessary (hereinafter, referred to as codec A), the calling party UE designates only a sampling frequency with respect to the codec A, and generates the SDP offer without bandwidth designation. For example, in FIG. 9, an AMR-WB codec (for example, bandwidth: 50 Hz to 7 kHz, sampling frequency: 16000) that is a WB codec in the related art, an AMR codec (for example, bandwidth: 300 Hz to 3.4 kHz, sampling frequency: 8000) that is an NB codec in the related art, and codec A in which bandwidth designation is not necessary (sampling frequency: 32000) are written in the SDP offer generated by the calling party UE.

Further, in a case where a receiving party UE itself supports codec A, the receiving party UE receives a condition in which only the sampling frequency of codec A is designated (selects codec A shown in FIG. 9), and generates the SDP answer without bandwidth designation. Codec A may be in an incompatible mode of the above-mentioned EVS codec. Here, the maximum bandwidth that supports the sampling frequency of 32000 of codec A corresponds to a super wideband (SWB), and an encoder may freely change the bandwidth according to the characteristic of the input signal or the encoding bit rate even during the session within the bandwidth.

Codec selection section 706 selects a codec negotiated by codec negotiation section 704, and outputs information that indicates the selected codec to bandwidth determination section 708.

Bandwidth determination section 708 determines the bandwidth of the input signal encoded in the host terminal with respect to the codec selected by codec selection section 706. For example, in a case where the bandwidth of the codec selected by codec selection section 706 is constant, bandwidth determination section 708 selects the bandwidth. On the other hand, in a case whom the bandwidth of the codec selected by codec selection section 706 can be changed during one session as in codec A, bandwidth determination section 708 determines, the bandwidth of the input signal to be encoded for each frame. For example, bandwidth determination section 708 determines the bandwidth of the input signal to be encoded for each frame, according to the encoding bit rate, the input signal characteristic, the bandwidth limitation request through an external signaling, or the like. More specifically, if it is notified that the limitation (change) of the bandwidth of the codec is requested from code mode change section 712, bandwidth determination section 708, for example, limits (changes) the bandwidth of the input signal to be encoded to the requested bandwidth.

Signaling analysis section 710 analyzes the signaling input through reception section 700. The signaling includes signaling for requesting the limitation of the bandwidth (signaling for limiting the bandwidth) from MSC/MGW 300, for example. Signaling analysis section 710 notifies codec mode change section 712 of the result of the signaling analysis.

In a case where the signaling analysis result input from signaling analysis section 710 is the signaling for requesting the limitation (change) of the bandwidth of the codec, the codec mode change section 712 determines to limit (change) the bandwidth of the input signal to be encoded, and notifies bandwidth determination section 708 of the result. That is, codec mode change section 712 controls the change of the bandwidth determined by bandwidth determination section 708 according to the signaling for limiting the bandwidth of the codec, notified from MSC/MGW 300.

Further, signaling analysis section 710 may analyze another external signaling and may notify codec mode change section 712 of the analysis result. For example, signaling analysis section 710 may analyze the above-described RTCP-APP, and may notify codec mode change section 712 of the analysis result (for example, a change request of the encoding bit rate). In this case, if codec mode change section 712 determines the encoding bit rate, codec mode change section 712 notifies bandwidth determination section 708 of the determined encoding bit rate. Then, bandwidth determination section 708 determines the bandwidth according to the determined encoding bit rate.

Next, an example of the operations of UE 100 and UE 102, and MSC/MGW 300 according to the present invention will be described.

Figure 2:
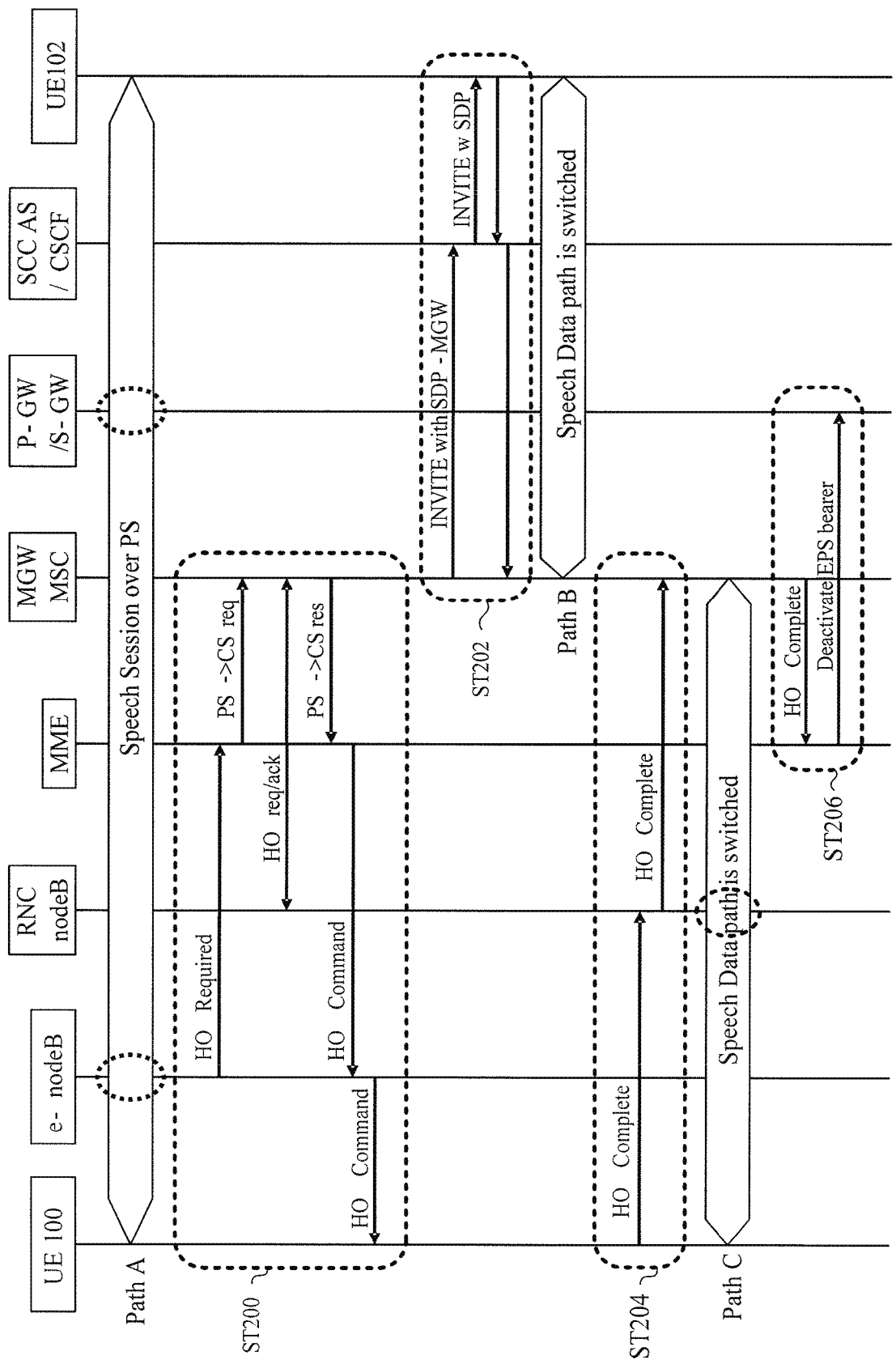
FIG. 2 is a sequence chart illustrating an SRVCC handover operation.
Figure 10:
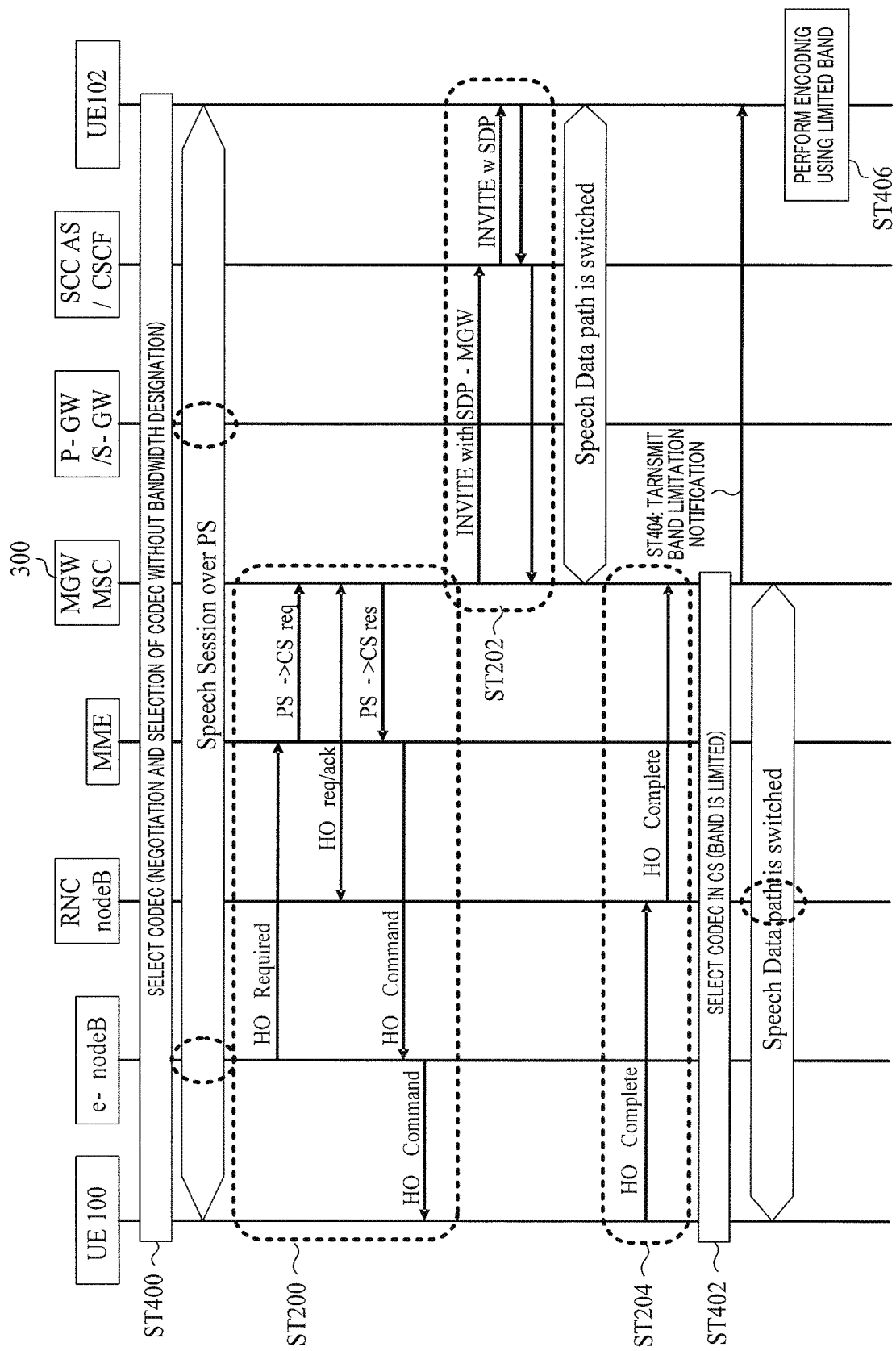
FIG. 10 is a sequence chart illustrating an operation according to Embodiment 1 of the present invention.

FIG. 10 is a sequence chart illustrating the operation of each device of the mobile communication network shown in FIG. 5. In FIG. 10, the same reference numerals are given to the same components as in FIG. 2, and description thereof will not be shown.

In the following description, in FIG. 5, it is assumed that both of UE 100 and UE 102 are connected to a wireless access network that enables a VoLTE call service such as e-UTRAN (here, a wireless access network, a base station and a PS network on UE 102 are not shown). That is, a VoLTE call is started between UB 100 and UB 102 shown in FIG. 5.

At the start of the call, negotiation of the codecs used between UE 100 and UE 102 is performed (for example, see 3GPP TS26.114 v10.0.0 "IP Multimedia Subsystem (IMS); Multimedia Telephony; Media Handling and interaction"). For example, UE 100 and UE 102 (codec negotiation section 704) performs the codec negotiation without bandwidth designation with respect to the codec in which bandwidth designation is not always necessary (ST400 shown in FIG. 5 and FIG. 10).

Then, as shown in FIG. 5, it is assumed that UE 100 moves to UTRAN through the SRVCC handover. That is, it is assumed that UE 100 moves to the CS network from the PS network.

In this case, in the process of ST204 in FIG. 10, the codec used in the CS network is re-negotiated between UE 100 (codec negotiation section 704) and MSC/MGW 300. Here, for example, it is assumed that the negotiation is performed so that the AMR codec is used for UE 100 and the bandwidth of the codec used by LE 100 is limited to the NB (ST402 shown in FIG. 5 and FIG. 10).

Further, MSC/MGW 300 (codec detection section 604 and codec bandwidth detection section 606) detects that the codec used by UE 102 is codec A and the maximum bandwidth is the SWB, in the process of ST202 in FIG. 10.

Furthermore, MSC/MGW 300 (codec detection section 604 and codec bandwidth detection section 606) detects that the codec used by UE 100 is the AMR and the bandwidth is limited to the NB, in the process of ST204 in FIG. 10.

MSC/MGW 300 (change determination section 608) determines whether bandwidth limitation of the input signal to be encoded to UE 102 is possible, and whether the bandwidth limitation is necessary. Here, the codec of UE 100 is changed (ST800 shown in FIG. 7: Yes), the codec of UE 102 is codec A (ST802 shown in FIG. 7: Yes), and the bandwidth (NB) of the AMR codec of UE 100 is narrower than the maximum bandwidth (SWB) of codec A of UE 102 (ST804 shown in FIG. 7: Yes). Thus, MSC/MGW 300 (change determination section 608) determines that the bandwidth limitation of the input signal to be encoded to UE 102 is possible and necessary (ST806 shown in FIG. 7).

Figures 11A, 11B:
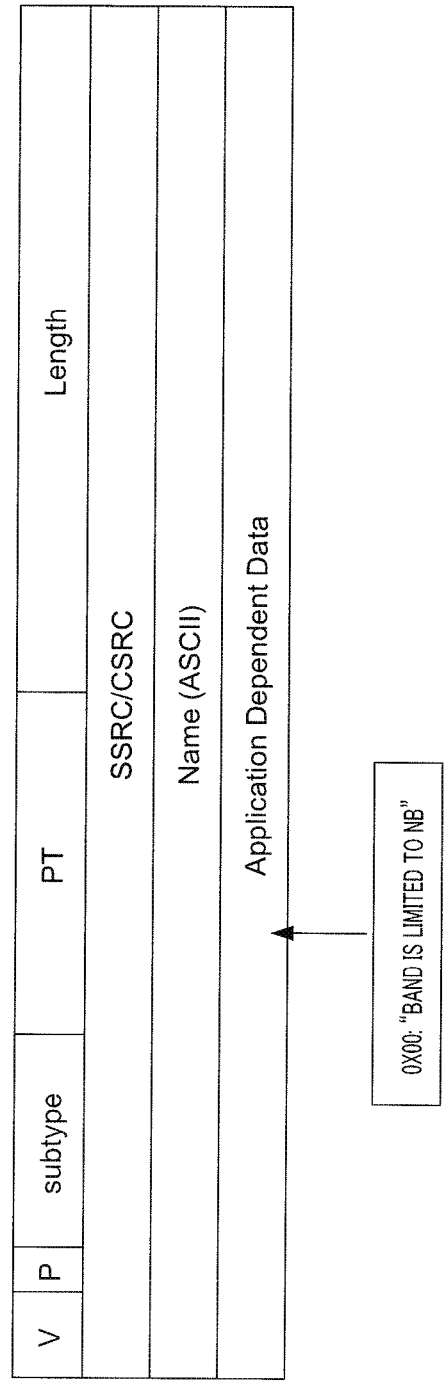
FIGS. 11A and 11B are diagrams illustrating an example of a band limitation request message according to Embodiment 1 of the present invention.

Accordingly, MSC/MGW 300 (signaling generation section 610) transmits, to UE 102, signaling for requesting limiting the bandwidth of the input signal to be encoded of codec A to NB (bandwidth of the changed codec of UE 100) (ST 404 shown in FIG. 5 and FIG. 10). The signaling may be included in a series of signaling (that is, IMS signaling) in ST202, for example, and may be transmitted as a separate signaling such as a real time transport control protocol (RTCP)-application-defined (APP) (for example, see [3GPP TS26. 114 v10.0.0 "IP Multimedia Subsystem (IMS); Multimedia Telephony; Media Handling and interaction"]). FIG. 1A shows an example in a case where a signaling for notifying band limitation is included in the IMS signaling. Further, FIG. 11B shows an example in a case where a signaling for notifying band limitation is included in the RTCP-APP.

UE 102 (signaling analysis section 710) analyzes the signaling from MSC/MGW 300. Then, UE 102 (codec mode change section 712) specifies that the bandwidth limitation of codec A is requested. Thus, UE 102 (bandwidth determination section 708) limits the bandwidth of the input signal to be encoded to UE 102 to the requested bandwidth (here, NB). Further, UE 102 encodes communication data in the limited bandwidth (ST406 shown in FIG. 10).

In this manner, UE 100 uses the bandwidth (NB) of the changed codec, and UE 102 uses the bandwidth (NB) in which the band of codec A is limited. Thus, both of UE 100 and UE 102 use the same NB as the code bandwidth. Accordingly, in MSC/MGW 300 (transcoding section 612), even in a case where transcoding from UE 102 to UE 100 (transcoding from codec A (ultrawide band) to AMR codec (narrow band)) is performed, it is possible to suppress degradation of speech quality.

In this manner, in the present embodiment, even in a case where a change of the codec occurs in UE 100 that is a part of UEs in communication, MSC/MGW 300 (network node) requests the other UE 102 to limit the bandwidth of the codec to match with the bandwidth of the changed codec of UE 100. Further, even in a case where the codec of UE 100 that is a communication counterpart during VoLTE call is changed (changed to a narrow bandwidth), UE 102 limits the bandwidth of the input signal to be encoded to UE 102 in accordance with UE 100. That is, UE 102 changes the bandwidth of the input signal to be encoded according to the network situation of UE 100 that is the communication counterpart without disconnection of communication with UE 100.

Thus, even in a case where the network situation of one UE is changed, it is possible to equivalently maintain the bandwidths of the codecs between UEs. Accordingly, it is possible to suppress degradation of speech quality that may occur in a case where transcoding is performed from a codec with a wide bandwidth to a codec with a narrow bandwidth. That is, MSC/MGW 300 is able to perform transcoding while suppressing degradation of speech quality.

Further, since UE 102 limits only the bandwidth of the input signal to be encoded without changing the codec, the signaling for changing the codec is not necessary, and thus, it is possible to prevent the disconnection time of the call from being prolonged.

Accordingly, according to the present embodiment, even in a case where UE 100 during VoLTE call is handed over to the CS network and the codec is changed in the CS network that is a handover destination, it is possible to limit the bandwidth of the input signal to be encoded to UE 102 without disconnection of the call. Thus, it is possible to suppress degradation of speech quality due to transcoding from UE 102 to UB 100. In other words, according to the present embodiment, even in a case where the codec used by one terminal of UEs during VoLTE call is changed, it is possible to suppress degradation of speech quality due to transcoding without disconnection of the call.

In the above-described present embodiment (for example, see FIG. 5), in a case where UE 100 corresponds to reverse SRVCC (rSRVCC, for example, see [3GPP TR23.885 v1.2.0 "Feasibility Study of Single Radio Voice Call Continuity (SRVCC) from UTRAN/GERAN to E-UTRAN/HSPA"]), after UE 100 is handed over to the CS network from the PS network, UE 100 may be handed over to the PS network from the CS network again. In this case, when receiving signaling relating to the handover process from the CS network of UE 100 to the PS network, MSC/MGW 300 may transmit signaling for releasing the bandwidth limitation of the codec to UB 102. Alternatively, after UE 100 finishes the handover to the PS network, MSC/MGW 300 may transmit the signaling for releasing the bandwidth limitation of the codec to UE 102.

Further, in the above-described present embodiment (for example, see FIG. 5), when UE 100 starts a call, UE 100 is connected to the PS network. However, UE 100 may be connected to the CS network when UE 100 starts the call. In this case, for example, using a technique disclosed in [3GPP TS23.292 v10.3.0 "IP multimedia Subsystem (MS) centralized services"], UE 100 starts the call with UE 102 connected to the PS network. Here, in a case where UE 100 corresponds to rSRVCC (that is, in a case where UE 100 may be handed over to the PS network), when performing negotiation with UE 102, MSC/MGW 300 may perform negotiation in advance so that the bandwidth of the codec to be used by UE 100 is encoded as the maximum bandwidth for UE 102. Alternatively, MSC/MGW 300 may request UE 102 to limit the bandwidth of the input signal to be encoded with a separate signaling after negotiation with UE 102.

Further, in the above description, the present embodiment employs the SRVCC method, but the present embodiment may also be applied in the eSRVCC method.

In the SRVCC technique, if codecs used by UEs in communication are different from each other, transcoding is performed in MGW (MSC/MGW 300). On the other hand, according to NPL 3, in the eSRVCC method, ATGW instead of MGW may perform transcoding.

Figure 3:
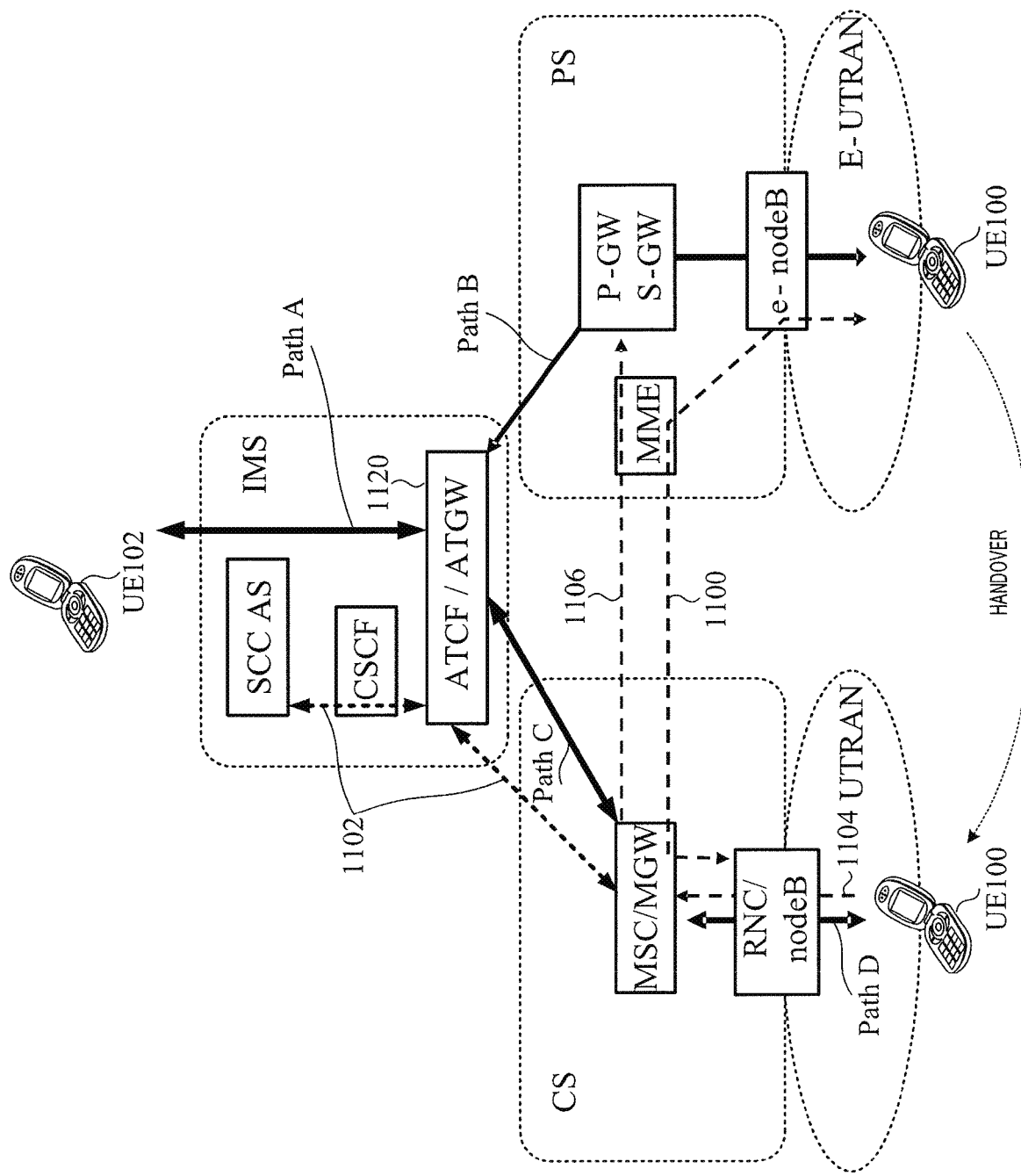
FIG. 3 is a configuration diagram illustrating a part of a 3GPP mobile communication network that enables eSRVCC.

Here, in the eSRVCC method, if transcoding is performed by ATGW instead of MGW, with respect to the SRVCC technique, the functions added to MSC/MGW 300 (see FIG. 5) according to the present embodiment are added to ATCF/ATGW 1120 (see FIG. 3). That is, in the eSRVCC method, ATCF/ATGW 1120 is configured to include reception section 600, transmission section 602, codec detection section 604, change detection section 608, signaling generation section 610 and transcoding section 612, shown in FIG. 6. Here, in the eSRVCC method, transmission section 602, codec detection section 604, codec bandwidth detection section 606, change detection section 608, signaling generation section 610 and transcoding section 612 included in ATCF/ATGW 1120 have the same functions as those of the respective sections included in MSC/MGW 300 in the SRVCC technique.

Reception section 600 (see FIG. 6) of ATCF/ATGW 1120 in the eSRVCC method receives communication data, signaling or the like. For example, when receiving signaling (for example, signaling 1102 shown in FIG. 3) that is transmitted from each of UE 100, UE 102, ATCF and MSC/MGW, reception section 600 outputs the received signaling to codec detection section 604 and codec bandwidth detection section 606.

Codec detection section 604 detects the codec used by each of UE 100 and UB 102 on the basis of the signaling, the communication data or the like from UE 100, UE 102, ATCF and MSC/MGW, input through reception section 600. Further, codec detection section 604 outputs information that indicates the detected codec (detection result) to change determination section 608.

Codec bandwidth detection section 606 detects the bandwidths of the codec used by each of UE 100 and UB 102 on the basis of the signaling, communication data or the like from UE 100, UE 102 and MSC/MGW, input through reception section 600. Further, codec bandwidth detection section 606 outputs information that indicates the bandwidth of the detected codec (detection result) to change determination section 608.

Here, ATCF/ATGW 1120 has been described as one node, but separate nodes may be used. Accordingly, any one of ATCF and ATGW or both ATCF and ATGW may have the functions included in the above-described ATCF/ATGW 1120. Further, necessary information may be exchanged between ATCF and ATGW.

Further, in the above embodiment, each UB may designate the maximum bandwidth using SDP in codec negotiation, instead of fixation and non-designation of the bandwidth using SDP as shown in FIG. 9.

Furthermore, in the above embodiment, there has been described a case where MSC/MGW 300 and ATGW transmit the signaling for requesting bandwidth limitation of the input signal to be encoded to UE 102. However, MSC/MGW 300 and ATGW may transmit signaling for requesting limiting the encoding bit rate instead of the signaling for requesting bandwidth limitation. Here, each UE sets the bandwidth of the input signal to be encoded on the basis of the encoding bit rate of the input signal. Accordingly, as MSC/MGW 300 and ATGW transmit the signaling for requesting limiting the encoding bit rate to UE, UE is able to set the limited encoding bit rate, and to limit the bandwidth of the input signal to be encoded on the basis of the limited encoding bit rate. Alternatively, MSC/MGW 300 and ATGW may transmit signaling for requesting limiting both of the bandwidth and the encoding bit rate.

Further, in the above embodiment, MSC/MGW 300 (FIG. 6) has been described as one node. However, MSC/MGW 300 may be configured by two or more nodes that are connected to each other by an interface, and the respective functions of the above-mentioned MSC/MGW 300 may be distributed to the plurality of nodes.

Embodiment 2

In Embodiment 1, a case where MSC/MGW 300 or ATGW (ATCF/ATGW 1120) transmits the signaling for requesting bandwidth limitation of the input signal to be encoded to UE 102 has been described. On the other hand, in the present embodiment, a case where MSC/MGW 300 or ATGW (ATCF/ATGW 1120) does not transmit the signaling for requesting bandwidth limitation and UE 102 receives communication data to detect that the bandwidth of the codec of UE 100 is limited and to limit the bandwidth of the input signal to be encoded to UE 102.

UE according to the present embodiment will be described with reference to FIG. 12.

Figure 12:
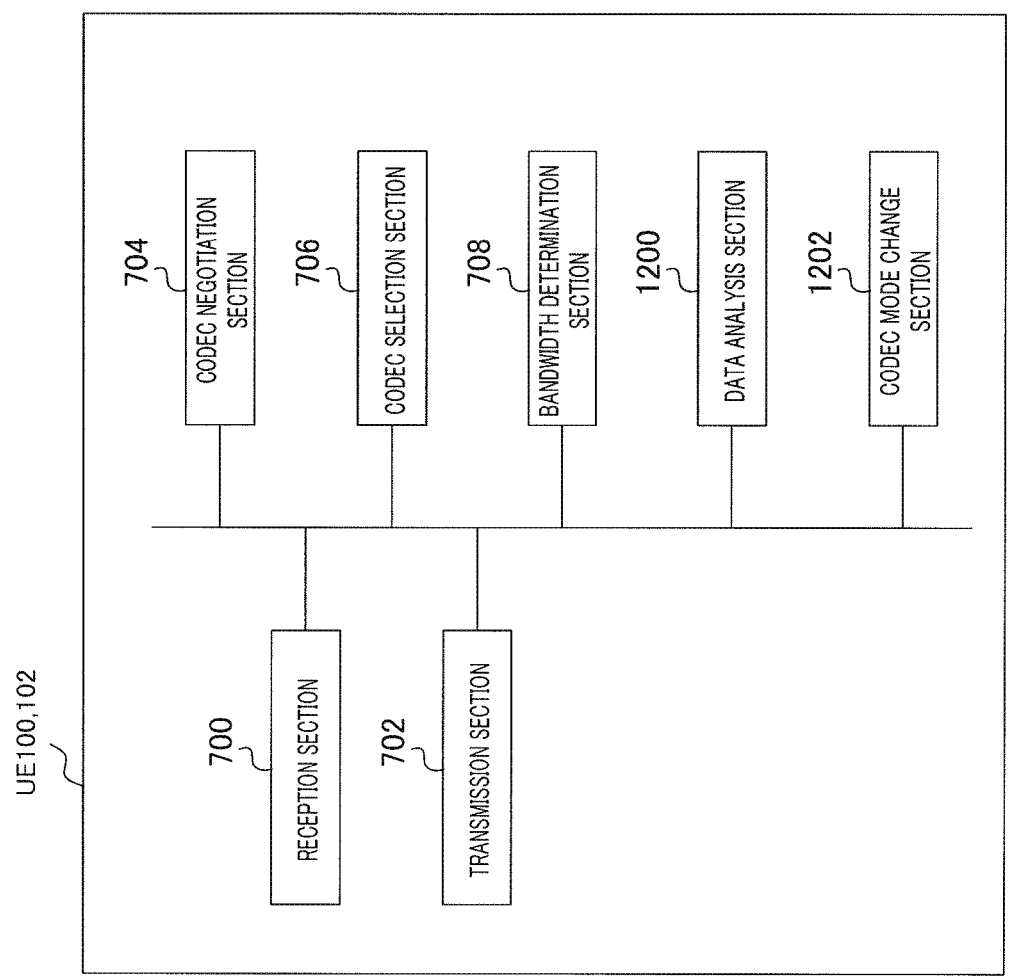
FIG. 12 is a block diagram illustrating a configuration of a terminal (UE) according to Embodiment 2 of the present invention.

In UEs 100 and 102 shown in FIG. 12, reception section 700, transmission section 702, codec negotiation section 704, codec selection section 706 and bandwidth determination section 708 are components that perform the same operations as in FIG. 8, and description thereof will be omitted.

Data analysis section 1200 analyzes communication data input through reception section 700. In a case where an upper limit value of the bandwidth of the codec of the communication data in a predetermined time from a certain time is different from an upper limit value of the codec bandwidth up to the time immediately before the certain time or an upper limit value of the bandwidth of the negotiated codec at the start of the call, the data analysis section 1200 analyzes that the bandwidth of the codec of the communication data of the terminal (UE) of the communication counterpart is limited (changed). Data analysis section 1200 notifies codec mode change section 1202 of the analysis result.

Codec mode change section 1202 determines to limit (change) the bandwidth of the input signal to be encoded on the basis of the analysis result from data analysis section 1200, and notifies bandwidth determination section 708 of the result. Thus, bandwidth determination section 708 controls a change of the bandwidth determined in codec mode change section 1202.

In this manner, in the present embodiment, UE 100 or UE 102 determines whether the codec of the terminal of the communication counterpart is changed, according to whether the upper limit value of the bandwidth of the codec of the received communication data is changed. Further, if it is determined that the codec of the terminal of the communication counterpart is changed, UE 100 or UE 102 controls a change of the bandwidth of the codec of the host device. Thus, similarly to Embodiment 1, even though a network situation of one UE is changed, it is possible to equivalently maintain the bandwidths of the codecs between UEs. Accordingly, similarly to Embodiment 1, it is possible to suppress degradation of speech quality that may occur in a case where transcoding is performed from a codec with a wide bandwidth to a codec with a narrow bandwidth.

Embodiment 3

Figure 13:
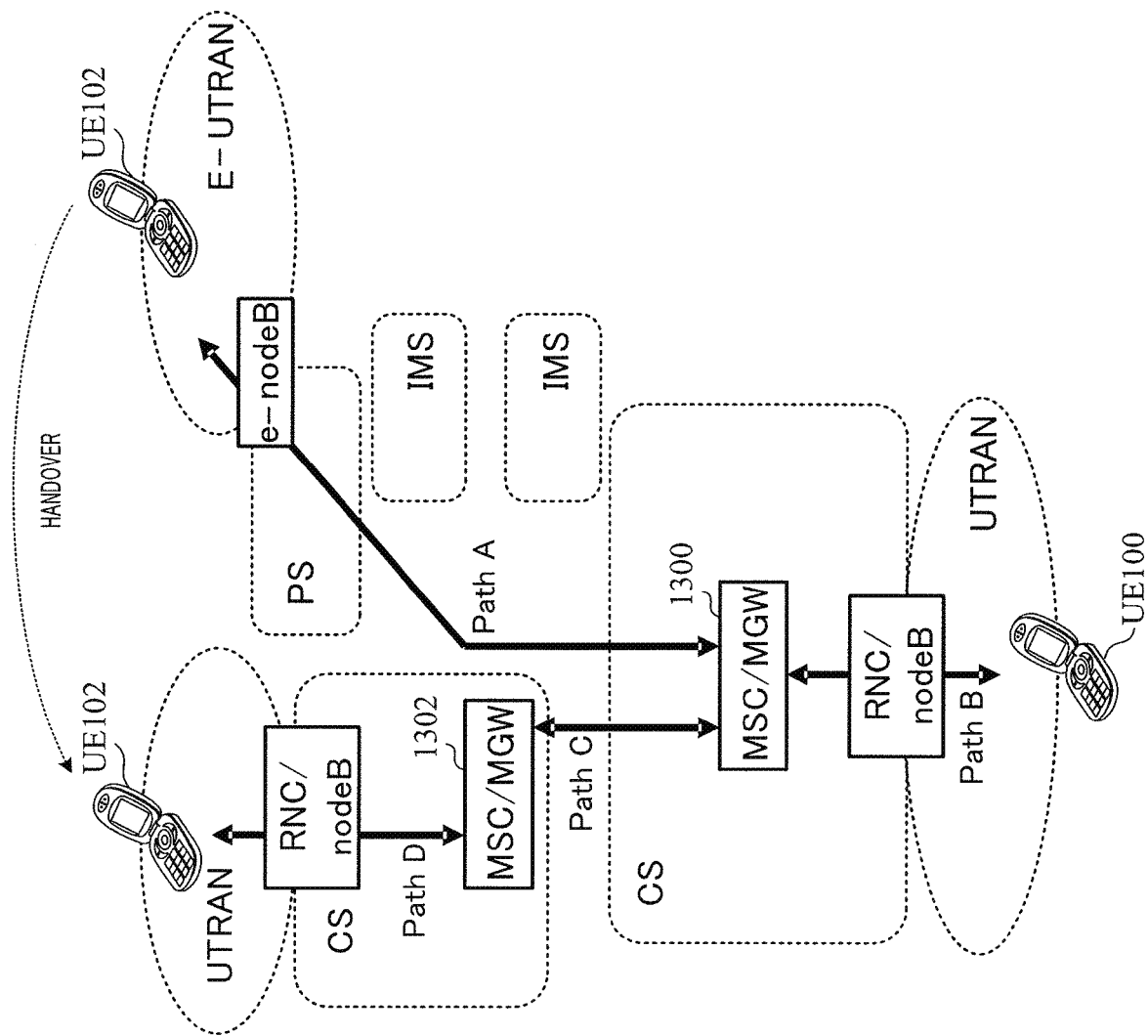
FIG. 13 is a configuration diagram illustrating a part of a mobile communication network according to Embodiment 3 of the present invention.

FIG. 13 is a configuration diagram illustrating a part of a mobile communication network according to Embodiment 3 of the present invention. An operation of each node shown in FIG. 13 is as described above (for example, FIG. 5).

In FIG. 13, UE 100 is initially handed over to the CS network by SRVCC (hereinafter, may be referred to as SRVCC handover), and performs transmission and reception of communication data with UE 102 that is present in the PS network through MSC/MGW 1300 (Path A and Path B shown in FIG. 13). Here, it is assumed that UE 100 uses AMR-WB as the codec used in the CS network, UE 102 uses the above-described codec A (in which bandwidth designation is not always necessary), for example, as the codec used in the PS network, and transcoding is performed in MSC/MGW 1300.

Then, it is assumed that UE 102 is also handed over to the CS network by SRVCC.

Here, according to the handover procedure of NPL 1, communication in the CS network that is a movement destination of UE 102 is terminated in MSC/MGW 1302, and the communication counterpart of MSC/MGW 1300 is changed from UE 102 to MSC/MGW 1302. That is, the path of communication data between UE 100 and UE 102 is changed to a path that passes through Path D, Path C and Path B.

Further, it is assumed that the codec used by UE 102 in the CS network is changed to AMR-WB. In this case, from UE 102 to MSC/MGW 1302, the communication data to be transmitted from UE 102 to UE 100 is transmitted through Path D and using AMR-WB. Then, MSC/MGW 1302 performs transcoding from AMR-WB used by UE 102 in the CS network to codec A used in the PS network. Accordingly, from MSC/MGW 1302 to MSC/MWG 1300, the communication data to be transmitted from UE 102 to UE 100 is transmitted through Path C and using codec A. Then, MSC/MGW 1300 performs transcoding from codec A to AMR-WB. Accordingly, from MSC/MGW 1300 to UE 100, the communication data to be transmitted from UE 102 to UE 100 is transmitted through Path B and using AMR-WB. This is similarly applied to communication data transmitted from UE 100 to UE 102.

In the present embodiment, a method of suppressing transcoding in MSC/MGWs 1300 and 1302 to the minimum even in a case where both of UE 100 and UE 102 during communication are subject to the SRVCC handover will be described.

First, MSC/MGWs 1300 and 1302 shown in FIG. 13 will be described.

Figure 14:
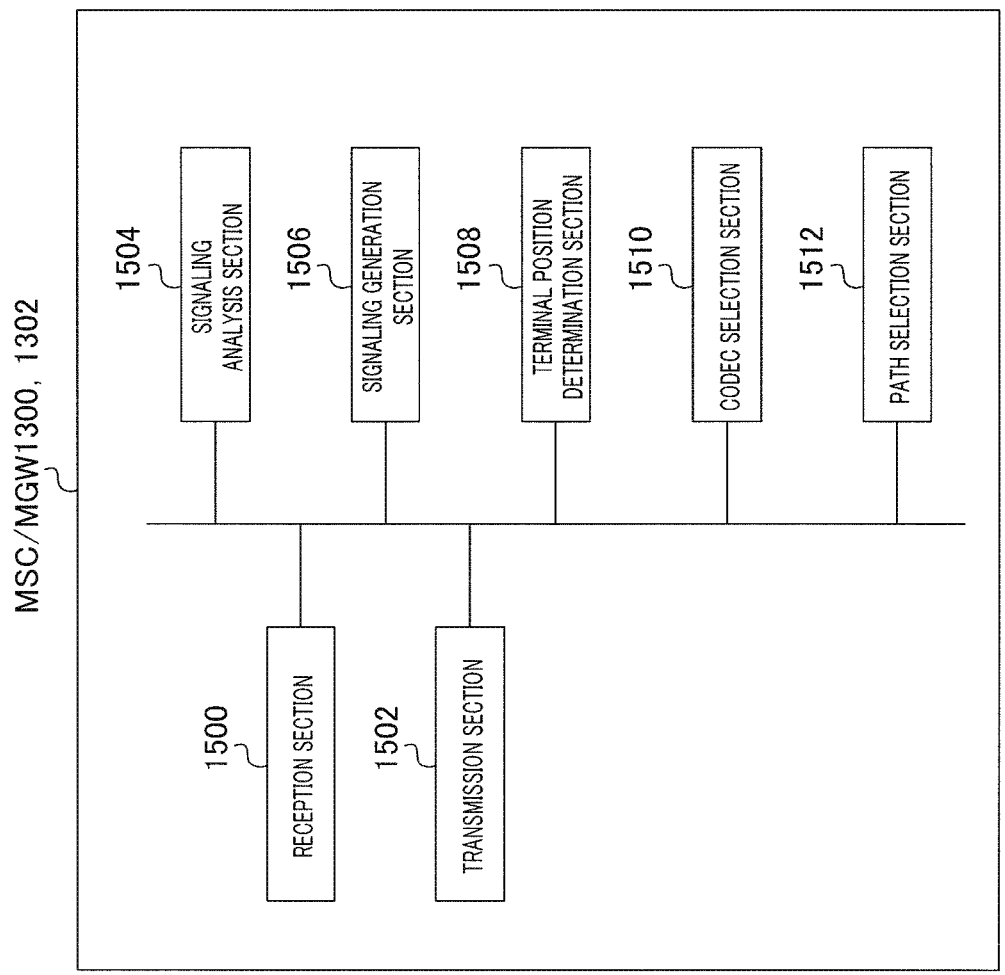
FIG. 14 is a block diagram illustrating a configuration of a network node (MSC/MGW) according to Embodiment 3 of the present invention.

FIG. 14 is a block diagram illustrating the configuration of MSC/MGWs 1300 and 1302 according to the present embodiment. MSG/MGWs 1300 and 1302 shown in FIG. 14 may include the functional block shown in FIG. 8 or a different functional block, instead of the functional block shown in FIG. 14.

In MSC/MGW 1300 or 1302 shown in FIG. 14, reception section 1500 receives communication data, signaling or the like.

Transmission section 1502 transmits communication data, signaling or the like.

Signaling analysis section 1504 analyzes signaling for the SRVCC process, signaling of IMS (IMS signaling) or the like. Signaling analysis section 1504 notifies signaling generation section 1506, terminal position determination section 1508 and codec selection section 1510 of the signaling analysis result.

Signaling generation section 1506 generates a signaling on the basis of the signaling analysis result of signaling analysis section 1504 or the like.

Terminal position determination section 1508 determines whether both terminals (UE 100 and UE 102) during communication are present in the PS network or in the CS network on the basis of the signaling analysis result of signaling analysis section 1504. Terminal position determination section 1508 outputs the determination result to codec selection section 1510 and path selection section 1512.

Codec selection section 1510 selects a codec to be used or a codec candidate on the basis of the signaling analysis result of signaling analysis section 1504 and the determination result of terminal position determination section 1508.

Path selection section 1512 selects a path through which communication data passes on the basis of the determination result of terminal position determination section 1508.

Next, an example of an operation of MSC/MGW 1300 and 1302 according to the present embodiment will be described.

Figure 15:
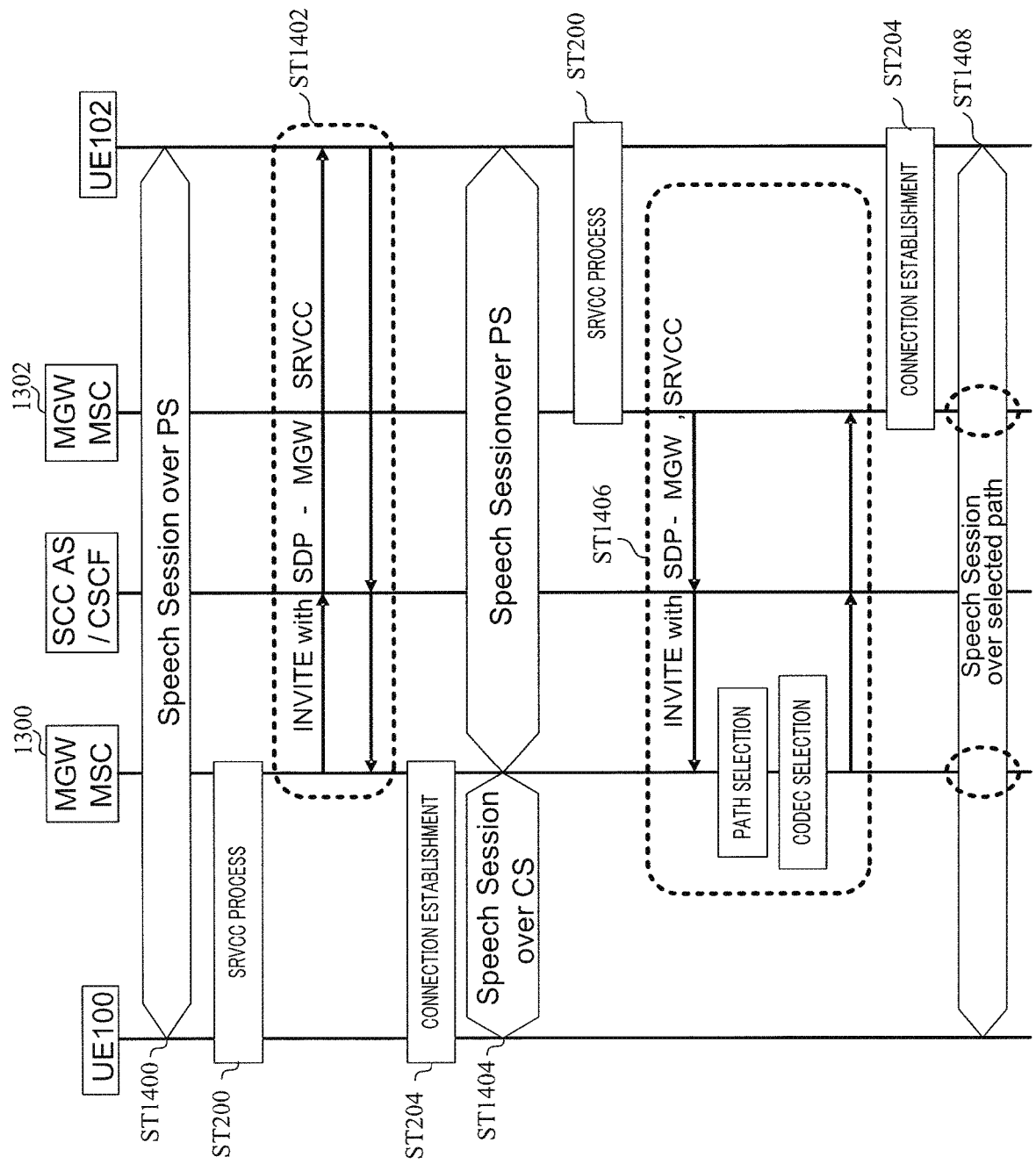
FIG. 15 is a sequence chart illustrating an operation according to Embodiment 3 of the present invention.

FIG. 15 is a sequence chart illustrating an operation of each device of the movement communication network shown in FIG. 13. Although not shown in FIG. 13, but it is assumed that SCC AS and CSCF are present as a part of IMS.

It is assumed that both of UE 100 and UE 102 are currently connected to e-UTRAN and perform VoLTE communication. That is, it is assumed that the above-described codec A (codec in which bandwidth designation is not always necessary) is currently used as a sound codec in UE 100 and UE 102 (ST1400 shown in FIG. 15).

Then, UE 100 is handed over (SRVCC handover) to the CS network (the same process as the process (SRVCC process) of ST200 shown in FIG. 10). Further, UE 100 is handed over to the CS network, and establishes connection with the CS network (the same process as the process (connection establishment process) of ST204 shown in FIG. 10).

At the same time with the process of ST200 and the process of ST204, signaling generation section 1506 of MSC/MGW 1300 generates IMS signaling to be transmitted to UE 102, and transmits the generated IMS signaling through transmission section 1502 (ST1402 shown in FIG. 15). Here, signaling generation section 1506 causes information indicating that the IMS signaling is the IMS signaling generated by SRVCC handover to be included in the IMS signaling. For example, the information indicating that the IMS signaling is the IMS signaling generated by the SRVCC handover may be a session transfer number for SRVCC (STN-SR) disclosed in NPL 3 or the like.

Further, signaling generation section 1506 of MSC/MGW 1300 causes a list of codecs supported in the CS network (CS network to which MSC/MGW 1300 belong) on the host network side, in addition to the codec (codec A) used by UE 100 in the PS network, to be included in the IMS signaling (ST1402 shown in FIG. 15). Here, signaling analysis section 1504 waits for the connection establishment process of ST204, analyzes signaling relating to the connection establishment, and obtains codec information to be used by UE 100 in the CS network. Then, signaling generation section 1506 may cause the codec information to be clearly included in the IMS signaling.

Thus, the communication is performed using the CS network from UB 100 to MSC/MGW 1300, and is performed using the PS network from MSC/MGW 1300 to UE 102 (ST1404 shown in FIG. 1S).

Then, UE 102 is handed over to the CS network (SRVCC handover) (the same process as ST200 (SRVCC process) shown in FIG. 10). Further, UE 102 is handed over to the CS network, and establishes connection with the CS network (the same process as the process (connection establishment process) of ST204 shown in FIG. 10).

At the same time with the process of ST200 and the process of ST204, signaling generation section 1506 of MSC/MGW 1302 generates an IMS signaling to be transmitted to MSC/MGW 1300, and transmits the generated IMS signaling through transmission section 1502 (ST1406 shown in FIG. 15). Here, signaling generation section 1506 causes information indicating that the IMS signaling is the IMS signaling generated by the SRVCC handover to be included in the IMS signaling. For example, the information indicating that the IMS signaling is the IMS signaling generated by the SRVCC handover may be a session transfer number for SRVCC (STN-SR) disclosed in NPL 3 or the like.

Further, signaling generation section 1506 of MSC/MGW 1302 causes a list of codecs supported in the CS network (CS network to which MSC/MGW 1302 belong) on the host network side, in addition to the codec (codec A) used by UE 102 in the PS network, to be included in the IMS signaling (ST1406 shown in FIG. 15). Here, signaling analysis section 1504 waits for the connection establishment process of ST204, analyzes signaling relating to the connection establishment, and obtains codec information to be used by UE 102 in the CS network. Then, signaling generation section 1506 may cause the codec information to be clearly included in IMS signaling.

Reception section 1500 of MSC/MGW 1300 receives the IMS signaling from MSC/MGW 1302, and outputs the received IMS signaling to signaling analysis section 1504. Signaling analysis section 1504 analyzes the IMS signaling, and thus, specifies that UE 102 is subject to the SRVCC handover, and outputs information indicating that UE 102 is subject to the SRVCC handover to terminal position determination section 1508. Further, signaling analysis section 1504 outputs the list (list of the codecs supported in the CS network to which MSC/MGW 1302 belong) of codes included in the IMS signaling (SDP offer) to the codec selection section 1510. Terminal position determination section 1508 determines that both of UE 100 and UE 102 are present in the CS network as UE 102 is subject to the SRVCC handover. Codec selection section 1510 selects a codec to be used, using the determination result of terminal position determination section 1508 and information (codec list) about the codecs supported in the CS network to which MSC/MGW 1302 belongs, input from signaling analysis section 1504 (ST1406 shown in FIG. 15).

Further, path selection section 1512 selects a path through which the communication data passes on the basis of the determination result of terminal position determination section 1508 (ST1406 shown in FIG. 15). Thus, the communication between UE 100 and UE 102 is performed through the selected path (ST1408 shown in FIG. 15).

Figure 16:
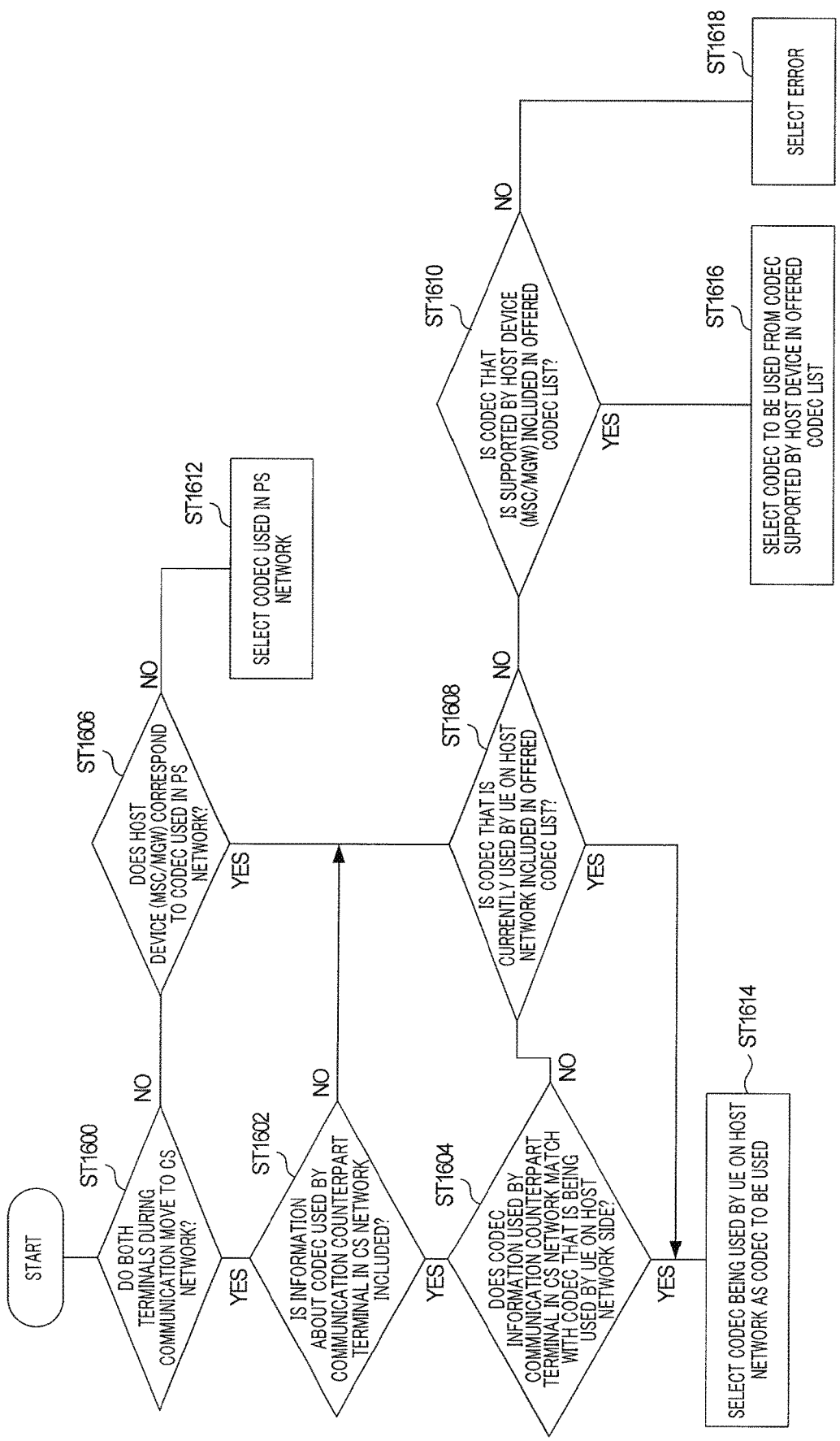
FIG. 16 is a flowhart illustrating an example of a codec selection method in a codec selection section of the MSC/MGW according to Embodiment 3 of the present invention.

Next, FIG. 16 shows an example of a codec selection method in codec selection section 1510 of MSC/MGW 1300 shown in FIGS. 13 to 15.

In ST1600 shown in FIG. 16, codec selection section 1510 determines whether both terminals (UE 100 and UE 102) during communication move to (are present in) the CS network on the basis of the determination result of terminal position determination section 1508.

If both terminals during communication move to the CS network (ST1600: YES), in ST1602, codec selection section 1510 determines whether information (codec list) about the codec used by the communication counterpart terminal (UE 102) in the CS network is included in the IMS signaling received in reception section 1500.

If the information about the codec used by the communication counterpart terminal in the CS network is included in the MS signaling (ST1602: Yes), in ST1604, codec selection section 1510 determines whether the information about the codec used by the communication counterpart terminal (UE 102) in the CS network matches with the codec by the terminal (UE 100) being used on the host network side. In a case where the codec information matches with the codec being used by the terminal (UE 100) on the host network side, the procedure goes to process of ST1614.

If both terminals during communication do not move to the CS network (ST1600: No), in ST1606, codec selection section 1510 determines whether the host device (MSC/MGW 1300) corresponds to a codec used in the PS network. If the host device (MSC/MGW 1300) does not correspond to the codec used in the PS network (ST1606: No), the procedure goes to a process of ST1612.

If the information about the codec used by the communication counterpart terminal in the CS network is not included in the IMS signaling (ST1602: No), or if the host vehicle (MSC/MGW 1300) corresponds to the codec used in the PS network, in ST1608, codec selection section 1510 determines whether the codec currently used by UE (UE 100) on the host network side is included in the codec information (codec list) offered by the IMS signaling (SDP offer). If the codec currently used by UE (UE 100) on the host network side is included in the offered codec list (ST1608: Yes), the procedure goes to a process of ST1614.

If the codec currently used by UE (UE 100) on the host network side is not included in the offered codec list (ST1608: No), in ST1610, codec selection section 1510 determines whether a codec supported by the host device (MSC/MGW 1300) is included in the codec list offered by the IMS signaling (SDP offer). If the codec supported by the host device is included in the offered codec list (ST1610: Yes), the procedure goes to a process of ST1616. If the codec supported by the host device is not included in the offered codec list (ST1610: No) the procedure goes to a process of ST1618.

In ST1612, codec selection section 1510 selects the codec used in the PS network.

In ST1614, codec selection section 1510 selects the codec that is being used by the terminal (UE 100) on the host network side as a codec to be used.

In ST1616, code selection section 1510 selects a codec to be used from the codecs supported by the host device (MSC/MGW 1300) in the offered codec list.

In ST1618, codec selection section 1510 selects an error.

In this manner, MSC/MGW 1300 or 1302 causes the list of the codecs supported in the CS network on the host network side to be included in the IMS signaling generated by the handover. Further, when receiving the IMS signaling, first, MSC/MGW 1300 (MSC/MGW 1302) determines whether both terminals during communication are present in the CS network. Further, MSC/MGW 1300 (MSC/MGW 1302) selects a codec to be used, using the information about the codecs supported in the CS network to which MSC/MGW that is a transmission destination of the IMS signaling belongs. Specifically, in a case where the same codec is usable by both terminals (UE 100 and UE 102) during communication, MSC/MGW 1300 or 1302 select a codec to be used so that the same codec is used by both terminals.

That is, in a case where one terminal (UE 100) is handed over to the CS network and the other terminal (UE 102) is handed over to the CS network, for example, MSC/MGW 1300 that belongs to the CS network of UE 100 receives a message including a list of codecs (codec group) supported by the CS network of UE 102 from MSC/MGW 1302 that belongs to the CS network of UE 102, and selects a codec to be used by UE 102, using the codec list and a codec (changed codec) to be used by UE 100. For example, in a case where the codec (changed codec) to be used by UE 100 is included in the received codec list, MSC/MGW 1300 selects the codec to be used by the UE 100 as the codec to be used by UE 102.

Thus, since substantially the same codec is used by both terminals (UE 100 and UE 102), transcoding is not performed in MSC/MGW 1300 or 1302. Accordingly, according to the present embodiment, even in a case where both of UE 100 and UE 102 during communication are subject to the SRVCC handover, it is possible to minimize transcoding in MSC/MGW 1300 or 1302.

Further, in Embodiment 1, the method has been described in which MSC/MGW 300 detects a change of the codec bandwidth and transmits the signaling for requesting limiting the bandwidth of the input signal to be encoded to UE 102. On the other hand, in the present embodiment, MSC/MGW 1300 or 1302 obtains the information about the codec to be used by each terminal in the host networks in the CS network, causes the codec information to be clearly included in the IMS signaling, instead of the signaling for requesting limiting the bandwidth of the input signal to be encoded, and transmits the result to the communication counterpart terminal. In this case, similarly to Embodiment 1, even in a case where a network situation of one UE or both UEs is changed, it is possible to equivalently maintain the bandwidths of the codecs between UEs.

In a case where it is determined by terminal position determination section 1508 that both of UE 100 and UE 102 are present in the CS network, path selection section 1512 may switch the entire path of the network to a path for the CS network. Terminal position determination section 1508 may determine whether both terminals correspond to rSRVCC, for example, as a determination method. That is, in a case where both terminals (UE 100 and UE 102) do not correspond to rSRVCC, path selection section 1512 may switch the path of the network to the path for the CS network. The method of determining whether both terminals correspond to rSRVCC may be realized by a method equivalent to registration of the SRVCC support or a method of determining whether both terminals are supported by SRVCC, disclosed in NPL 3.

Figure 17:
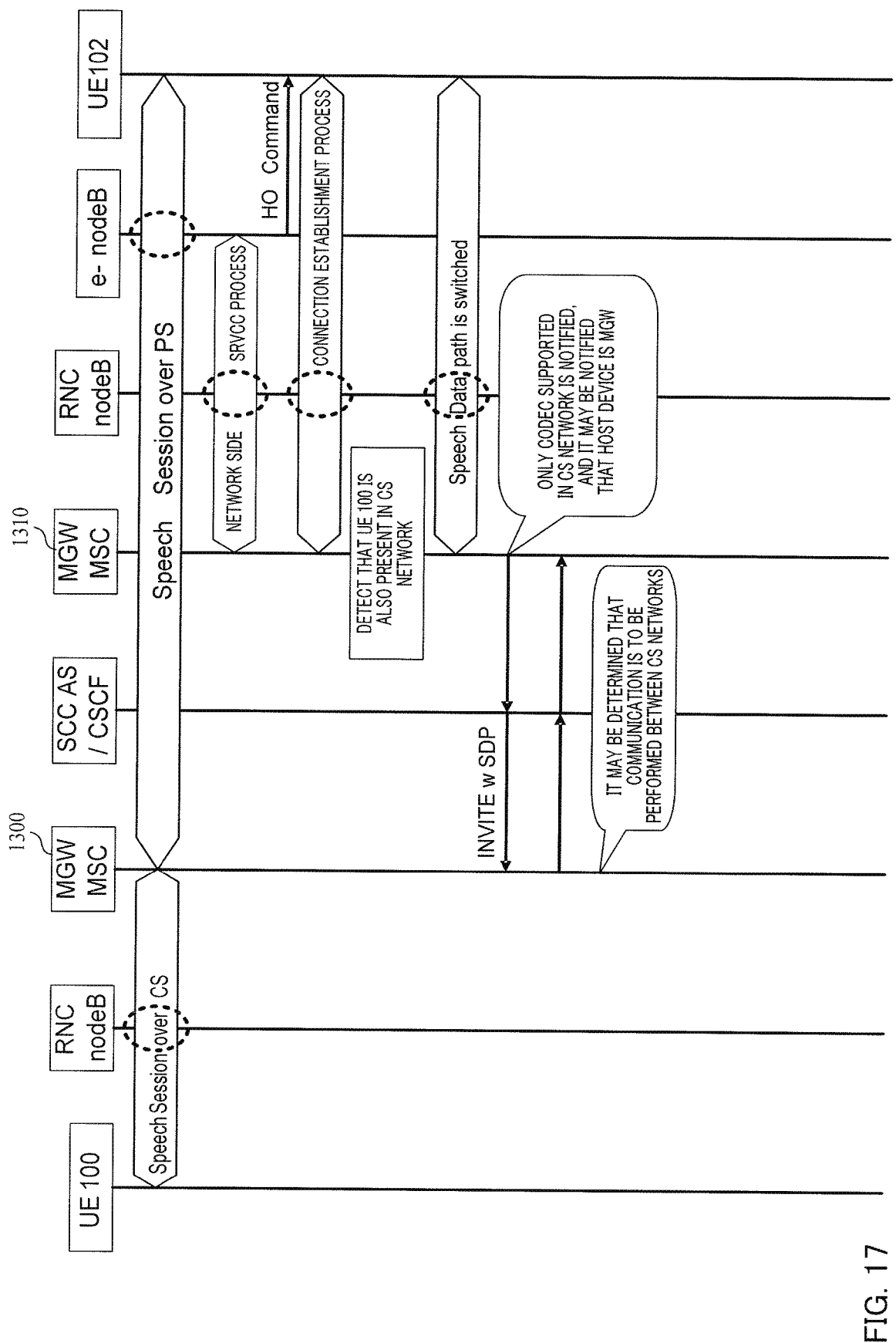
FIG. 17 is a sequence chart illustrating an operation according to a variation of Embodiment 3 of the present invention.

Further, in a case where it is determined that the communication counterpart terminal (for example, UE 100 shown in FIG. 17) is subject to the SRVCC handover by reception of the signaling for requesting limiting the bandwidth of the input signal to be encoded, or the like, the terminal (for example, UE 102 shown in FIG. 17) may notify MSC/MGW (for example, MSC/MGW 1310 shown in FIG. 17) on the host network side that the communication counterpart terminal (UE 100) is already subject to the SRVCC handover, by signaling (ST200 or ST204 shown in FIG. 15) when the host device is subject to the SRVCC handover. Thus, terminal position determination section 1508 of MSC/MGW 1310 determines that both terminals (UB 100 and UE 102) are handed over to the CS network, and thus, may prevent a codec supported only in the PS network from being included in the codec list of the IMS signaling (SDP offer). That is, MSC/MGW 1310 may cause only the codec supported in the CS network to be included in the SDP offer (see FIG. 17). Here, MSC/MGW 1310 may clearly notify that the host device is MGW (for example, see FIG. 17). Further, MSC/MGW 1300 that receives the notification may determine to perform communication in the CS networks (for example, see FIG. 17). Further, the notification may be included in the existing signaling transmitted from UE 102 when UE 102 is handed over to the CS network, or may be a new signaling. Further, the notification may be included in a signaling transmitted to MME (not shown) before UE 102 is handed over to the CS network (for example, see NPL 4).

Embodiment 4

In the present embodiment, a case where both UEs are handed over to the CS network from the PS network by eSRVCC, or a case where one UE is handed over to the CS network from the PS network by eSRVCC and the other UE is handed over to the CS network from the PS network by SRVCC will be described. In the present embodiment, in the eSRVCC technique, it is assumed that communication data is anchored in ATGW, and transcoding is performed in ATGW.

Figure 18:
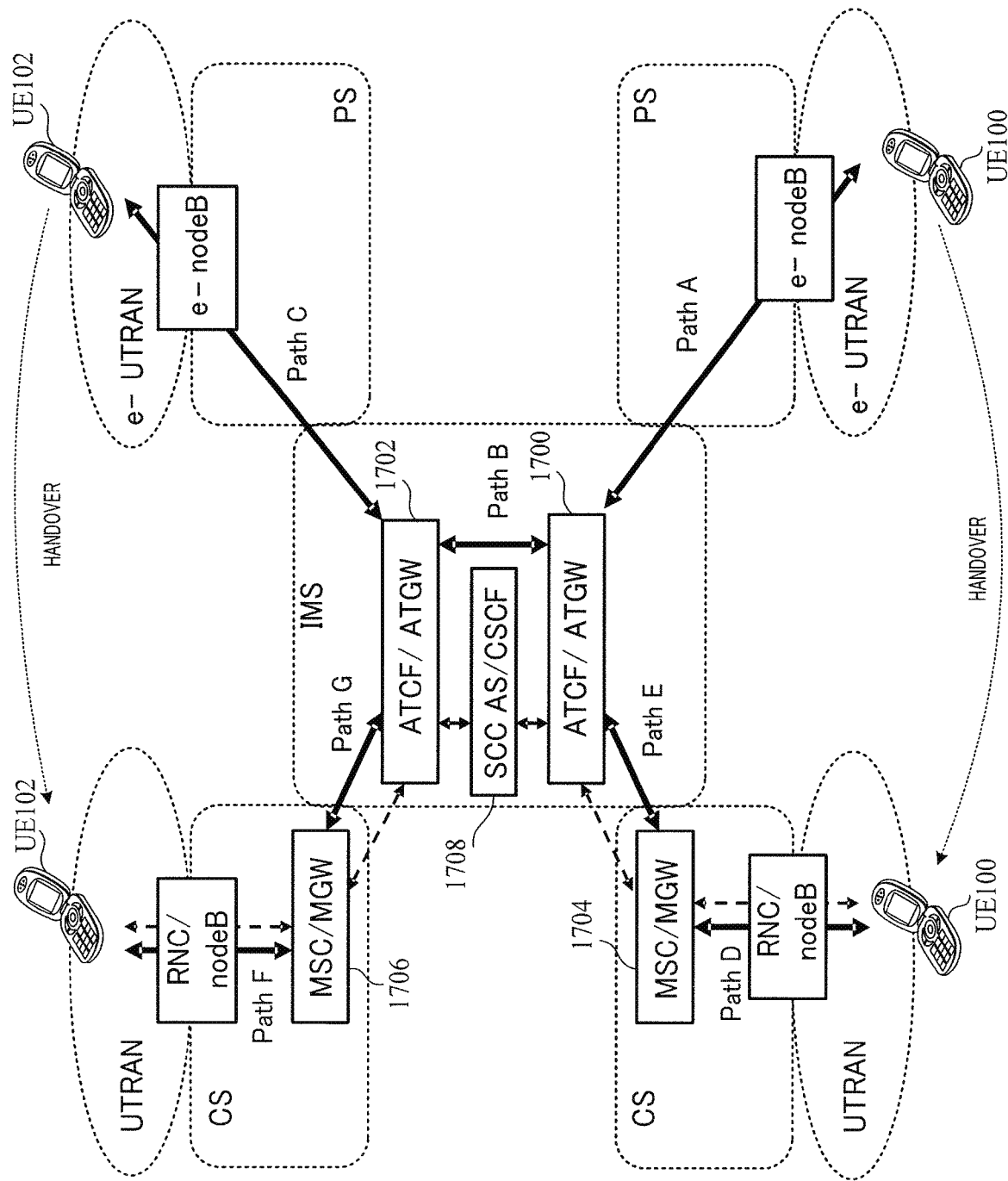
FIG. 18 is a configuration diagram illustrating a part of a mobile communication network according to Embodiment 4 of the present invention.

FIG. 18 is a diagram illustrating a configuration of a part of a mobile communication network according to Embodiment 4 of the invention. Operations of respective nodes shown in FIG. 18 are as described above (for example, FIGS. 3 and 5).

In FIG. 18, both of UE 100 and UE 102 are initially present in e-UTRAN, and perform VoLTE communication in the PS network. Here, it is assumed that the above-mentioned codec A (codec in which bandwidth designation is not always necessary) is used. In FIG. 18, it is assumed that both of the network of UE 100 and the network of UE 102 correspond to eSRVCC. Thus, a current communication path between UE 100 and UE 102 corresponds to Path A, Path B and Path C that pass through ATCF/AGW 1700 and ATCF/ATGW 1702.

In FIG. 18, ATCF/ATGWs 1700 and 1702 may be represented as one node, but may be provided as different nodes. Further, in FIG. 18, in a case where the network of UE 100 does not correspond to eSRVCC, since ATCF/ATGW 1700 and Path B are not present as a communication path between UE 100 and UE 102, Path A is established between UE 100 and ATCF/ATGW 1702. Similarly, in a case where the network of UE 102 does not correspond to eSRVCC, since ATCF/ATGW 1702 and Path B are not present as a communication path, Path C is established between UE 102 and ATCF/ATGW 1700.

Then, it is assumed that each of UE 100 and UE 102 performs handover by eSRVCC. In this case, according to NPL 3, a communication path between UE 100 and UE 102 after handover becomes Path D, Path E, Path B, Path G and Path F that pass through MSC/MGW 1704, ATCF/ATGW 1700, ATCF/ATGW 1702 and MSC/MGW 1706.

In FIG. 18, in a case where the network of UE 100 does not correspond to eSRVCC, since ATCF/ATGW 1700 and Path B are not present as a communication path between UE 100 and UE 102, Path E is established between MSC/MGW 1704 and ATCF/ATGW 1702. Similarly, in a case where the network of UE 102 does not correspond to eSRVCC, since ATCF/ATGW 1702 and Path B are not present as a communication path between UE 100 and UE 102, Path G is established between MSC/MGW 1706 and ATCF/ATGW 1700.

Here, for example, it is assumed that the both codecs used when UE 100 and UE 102 are handed over to the CS network are AMR-WB. In this case, communication data to ATCF/ATGW 1700 from UE 100 is encoded in AMR-WB. Then, ATGW 1700 performs transcoding to from AMR-WB to codec A. Accordingly, communication data to ATGW 1702 from ATGW 1700 is encoded in codec A. Thereafter, ATGW 1702 performs transcoding from codec A to AMR-WB, again. Accordingly, the communication data transmitted from ATGW 1702 to UE 102 is encoded in AMR-WB.

Further, in a case where the network of UE 100 does not correspond to eSRVCC, transcoding is performed in MSC/MGW 1704 instead of ATGE 1700. Similarly, in a case where the network of UE 102 does not correspond to eSRVCC, transcoding is performed in MSC/MGW 1706 instead of ATGE 1702.

In the present embodiment, with respect to a case where both of UE 100 and UE 102 during communication are handed over to the CS network from the PS network by eSRVCC, or a case whom one UE is handed over to the CS network from the PS network by eSRVCC and the other UE is handed over to the CS network from the PS network by SRVCC, a method of suppressing transcoding to the minimum, similarly to Embodiment 3, will be described.

First, ATCF/ATGWs 1700 and 1702, and UEs 100 and 102 shown in FIG. 18 will be described.

Figure 19:
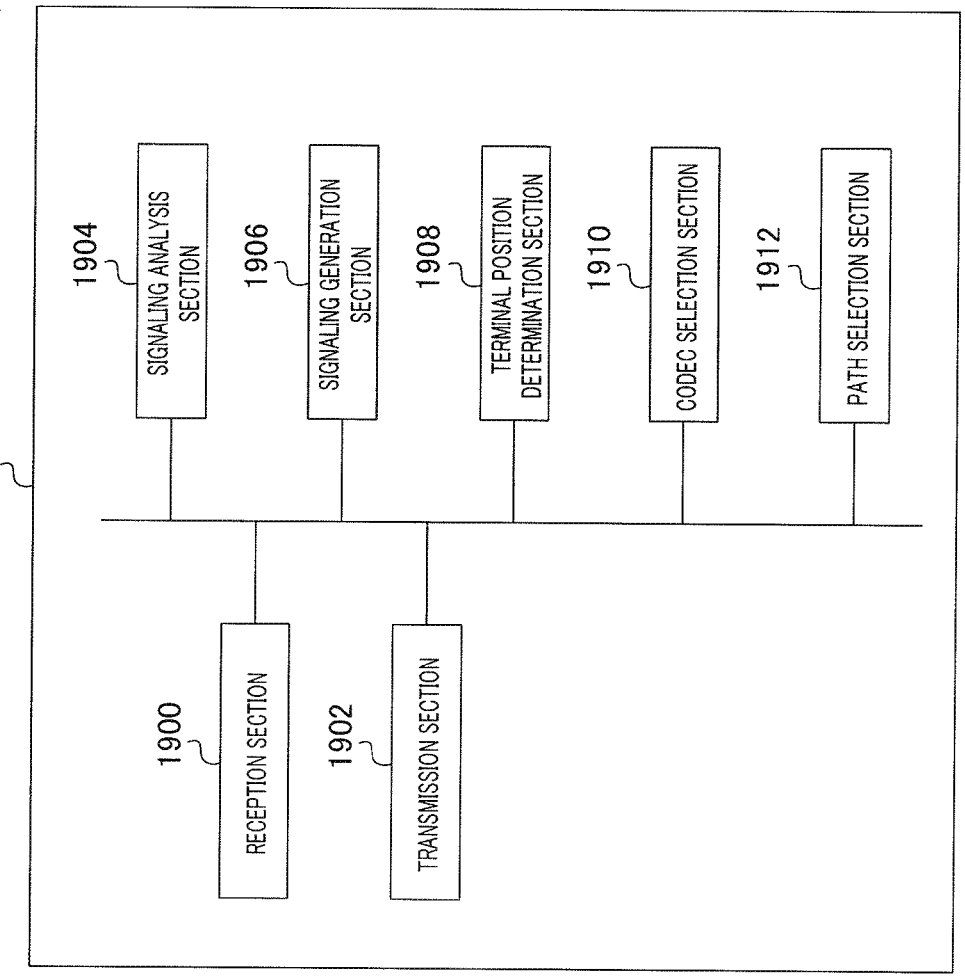
FIG. 19 is a block diagram illustrating a configuration of a network node (ATCF/ATGW, MSC/MGW) according to Embodiment 4 of the present invention.

FIG. 19 is a block diagram illustrating a configuration of ATCF/ATGWs 1700 and 1702 according to the present embodiment. ATCF/ATGWs 1700 and 1702 shown in FIG. 19 may include the functional block shown in FIG. 8 or a different functional block, instead of the functional block shown in FIG. 19.

In ATCF/ATGWs 1700 and 1702 shown in FIG. 19, reception section 1900 receives communication data, signaling or the like.

Transmission section 1902 transmits the communication data and the signaling and the like.

Signaling analysis section 1904 analyzes signaling for the SRVCC process or eSRVCC process, signaling of IMS (IMS signaling) or the like. Signaling analysis section 1904 notifies signaling generation section 1906, terminal position determination 1908 and codec selection section 1910 of the result of the signaling analysis.

Signaling generation section 1906 generates a signaling on the basis of the signaling analysis result of signaling analysis section 1904 or the like.

Terminal position determination section 1908 determines whether both terminals (UE 100 and UE 102) during communication am present in the PS network or in the CS network on the basis of the signaling analysis result of signaling analysis section 1904. Terminal position determination section 1908 outputs the determination result to codec selection section 1910 and path selection section 1912.

Codec selection section 1910 selects a codec or a codec candidate to be used on the basis of the signaling analysis result of signaling analysis section 1904 and the determination result of terminal position determination section 1908.

Path selection section 1912 selects a path through which communication data passes on the basis of the determination result of terminal position determination section 1908.

Figure 20:
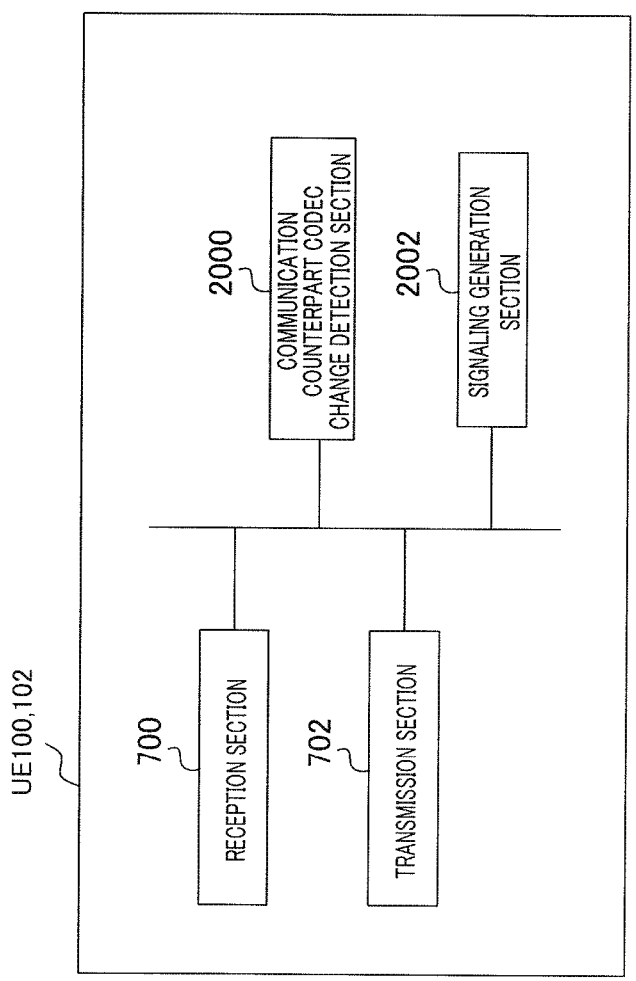
FIG. 20 is a block diagram illustrating a configuration of a terminal (UE) according to Embodiment 4 of the present invention.

FIG. 20 is a block diagram illustrating a configuration of UE 100 and UE 102 according to the present embodiment. UE 100 and UE 102 may include the functional block shown in FIG. 12 or a different functional block, instead of the functional block shown in FIG. 20. In UE 100 and UE 102 shown in FIG. 20, reception section 700 and transmission section 702 perform the same operation as in FIG. 12, and description thereof will be omitted.

In UE 100 and UE 102 shown in FIG. 20, communication counterpart codec change detection section 2000 detects that the codec used by the communication counterpart is changed. The codec used by the communication counterpart is changed because the communication counterpart moves to the CS network from the PS network, for example. Further, as a detection method of codec change in communication counterpart codec change detection section 2000, a method of receiving signaling for band limitation notification or the like from the network as in Embodiment 1, a method of detecting that the band of the codec used by the communication counterpart is limited as in Embodiment 2, or the like may be used.

In a case where it is detected that the codec of the communication counterpart is changed by communication counterpart codec change detection section 2000, signaling generation section 2002 generates a signaling for notifying the network that the codec of the communication counterpart is changed.

Then, an example of operations of UEs 100 and 102 and ATCF/ATGWs 1700 and 1702 in the present embodiment will be described. Here, it is assumed that both of the network of UE 100 and the network of UE 102 correspond to eSRVCC.

Figure 21:
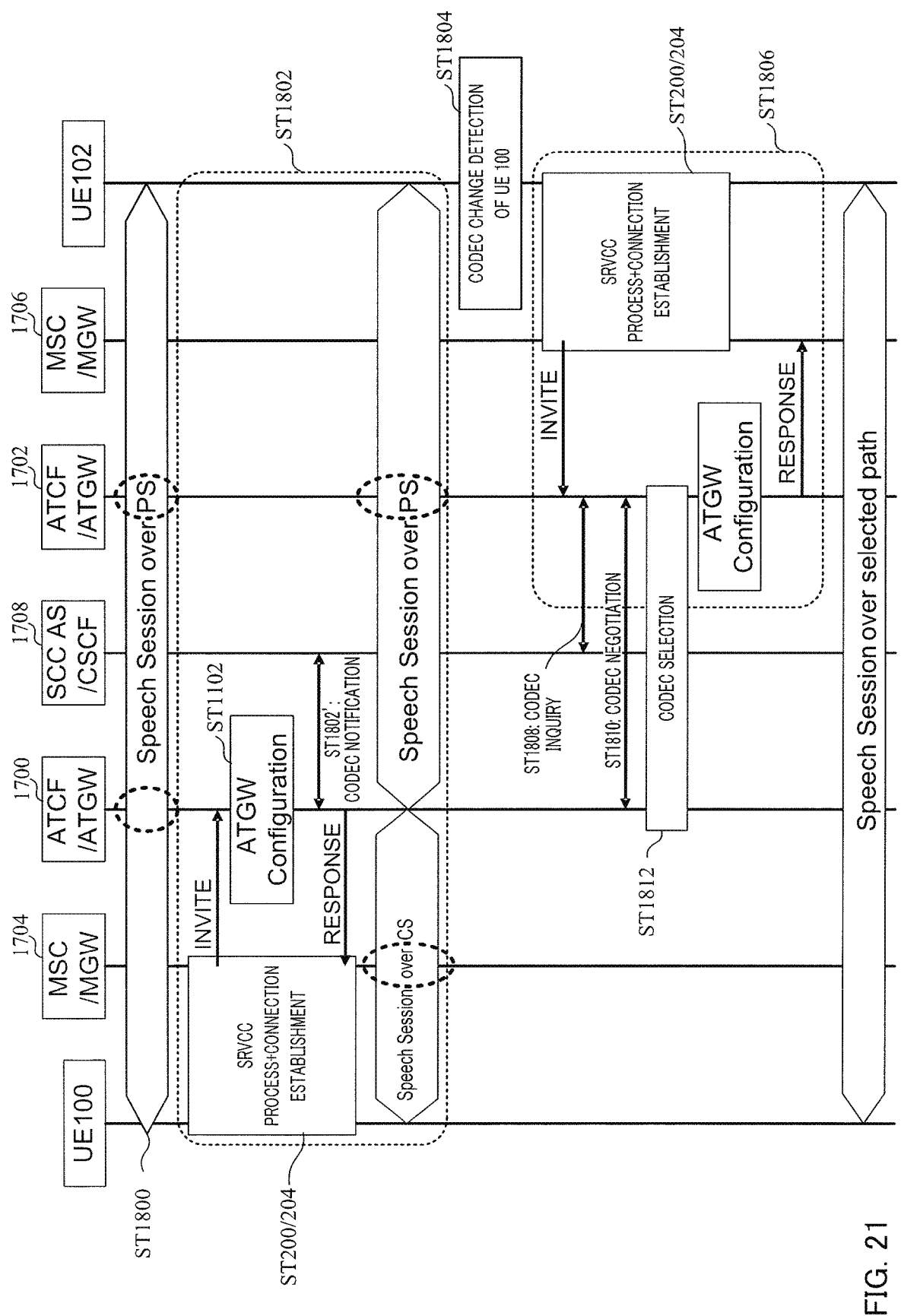
FIG. 21 is a sequence chart illustrating an operation of Embodiment 4 of the present invention.

FIG. 21 is a sequence chart illustrating an operation of each device of the mobile communication network shown in FIG. 18.

When performing a connection process to e-UTRAN and performing registration relating to VoLTE with respect to IMS, for example, UE 100 and UE 102 transmit information about ATCF (ATCF/ATGWs 1700 and 1702) to SCC AS, HSS (not shown), or MME (not shown), for example, and the information is retained at a transmission destination (for example, see NPL 5). Further, when an outgoing call is made (in the present embodiment, it is assumed that outgoing call is made from UE 100 to UE 102, which is similarly applied to an outgoing call from UE 102 to UE 100), in ATCF/ATGWs 1700 and 1702, ATCF determines whether a session is anchored by ATGW (for example, see NPL 3 or NPL 5).

Thereafter, UE 100 and UE 102 are both connected to e-UTRAN, and perform VoLTE communication. Here, it is assumed that the above-described codec A (codec in which bandwidth designation is not always necessary) is used as a sound codec (ST1800 shown in FIG. 21).

Figure 4:
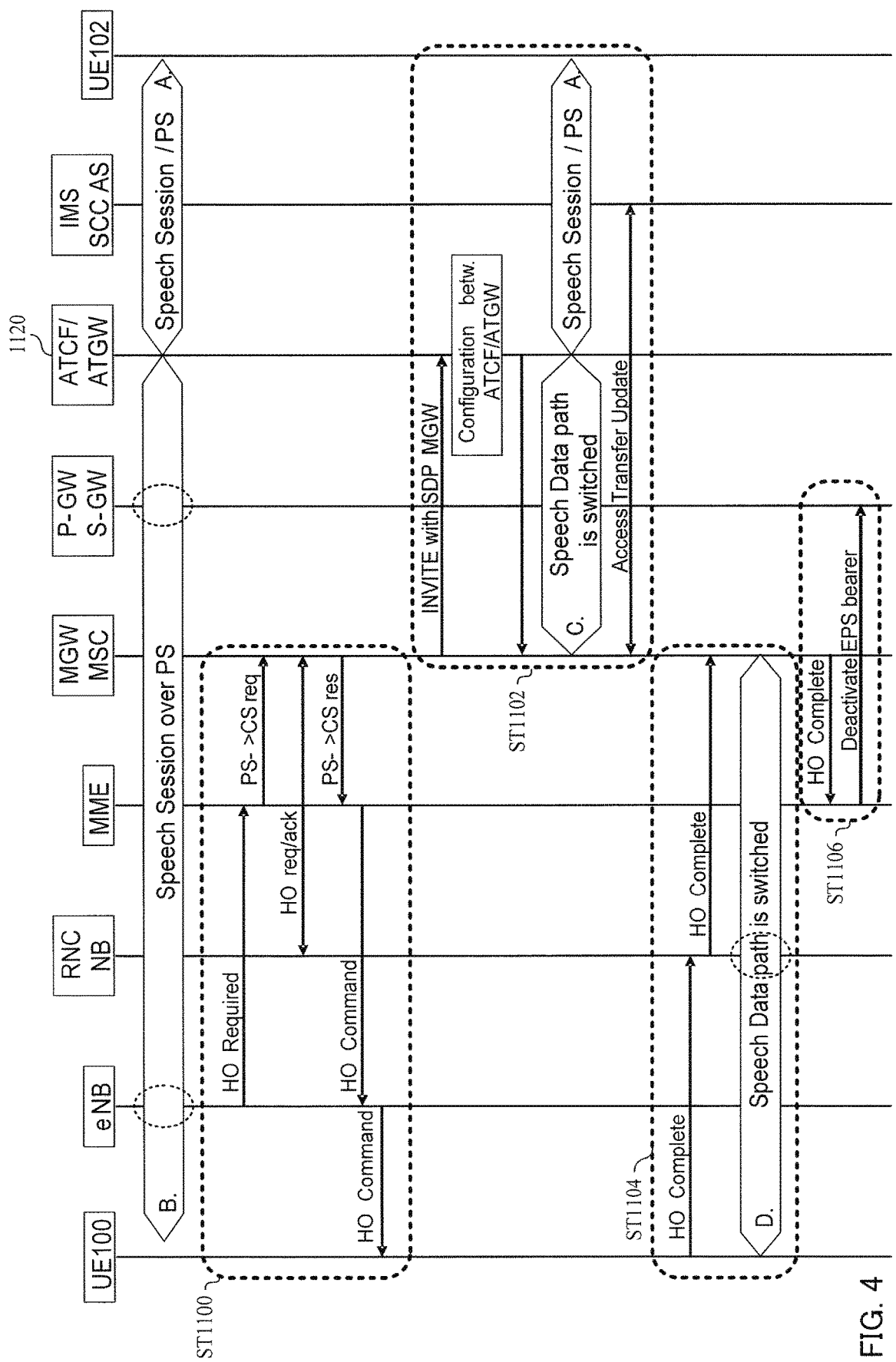
FIG. 4 is a sequence chart illustrating an eSRVCC handover operation.

Then, UE 100 is handed over to the CS network from the PS network. Here, the same processes as the process (SRVCC process) of ST200 and the process of ST204 (connection establishment process) shown in FIG. 10 are performed. Further, at the same time with the process of ST200 and the process of ST204, the same process as the process of ST1102 shown in FIG. 4 is performed. Thus, the data communication path between UE 100 and UE 102 is switched through MSC/MGW 1704 (ST1802 shown in FIG. 21).

Here, signaling generation section 1906 of ATCF/ATGW 1700 generates a signaling that includes the codec (for example, AMR) used by UE 100 in the CS network, and notifies SCC AS/CSCF 1708 of the message through transmission section 1902 (ST1802' shown in FIG. 21). This notification may be notified together with an access transfer update message disclosed in NPL 3. Then, as shown in Embodiment 1, ATCF/ATGW 1700 may transmit band limitation notification to UE 102.

Communication counterpart codec change detection section 2000 of UE 102 detects that the codec of UE 100 is changed from codec A (ST1804 shown in FIG. 21).

Then, UE 102 is also handed over to the CS network from the PS network. Here, signaling generation section 2002 of UE 102 generates a signaling for notifying the network that the codec of UE 100 that is the communication counterpart is changed. For example, when UE 102 is handed over to the CS network, the signaling may be included in the existing signaling transmitted from UE 102, or may be included in a new signaling (ST1806 shown in FIG. 21). Further, the notification may be included in a signaling transmitted to MME (not shown) before UE 102 is handed over to the CS network, or may be notified to MSC/MGW 1706 from MME (for example, see NPL 4).

MSC/MGW 1706 that receives the signaling from UE 102 detects that the codec of UE 100 that is the communication counterpart of UE 102 is changed, and causes information indicating that the code of UE 100 is changed to be included in an INVITE message to be transmitted to ATCF/ATGW 1702.

Signaling analysis section 1904 of ATCF/ATGW 1702 that receives the INVITE message detects that the codec of UE 100 that is the communication counterpart of UE 102 is changed. Thus, signaling generation section 1906 of ATCF/ATGW 1702 generates a signaling for codec inquiry of UE 100 to SCC AS/CSCF 1708, and transmits the generated signaling through transmission section 1902 (ST1808 shown in FIG. 21).

Reception section 1900 of ATCF/ATGW 1702 receives a reply signaling for the signaling transmitted in ST1808 from SCC AS/CSCF 1708. Further, signaling analysis section 1904 of ATCF/ATGW 1702 analyzes the reply signaling, performs codec negotiation with ATCF/ATGW 1700 on the basis of the analysis result (information relating to the codec of UE 100) (ST1810 shown in FIG. 21), and selects a codec (ST1812 shown in FIG. 21). Further, codec negotiation may be performed between ATCF/ATGW 1702 and SCC AS/CSCF 1708, and between SCC AS/CSCF 1708 and ATCF/ATGW 1700 (that is, may be anchored by SCC AS). Further, ATCF/ATGWs 1700 and 1702 may perform codec negotiation without through SCC AS/CSCF 1708. In this case, the process of ST1802 and the process of ST808 shown in FIG. 21 are not necessary.

In this manner, in a case where a terminal (UE 100 or 102) is handed over, ATCF/ATGW 1700 or 1702 generates a message that includes a codec to be used by the handed over terminal in the CS network, and notifies SCC AS/CSCF 1708 of the message. In this case, a communication counterpart terminal that performs communication with the handed-over terminal detects that the codec of the handed-over terminal is changed. Further, in a case where the communication counterpart terminal that detects that the codec of the handed-over terminal is changed is also handed over, if it is detected that the codec of the initially handed-over terminal is changed by the notification from the communication counterpart terminal, ATCF/ATGW 1700 or 1702 performs codec inquiry of the communication counterpart to SCC AS/CSCF 1708. Further, ATCF/ATGW 1700 or 1702 performs codec negotiation on the basis of information relating to the codec (codec of the initially handed-over terminal) obtained by the inquiry, and selects a codec. For example, ATCF/ATGW 1700 or 1702 selects a codec to be used so that in a case where the same codec is usable by both terminals (UE 100 and UE 102) during communication, the same codec is used by the both terminals.

That is, in a case where one terminal (UE 100) is handed over to the CS network, and then, the other terminal (UE 102) is handed over to the CS network, and in a case where ATCF/ATGW 1702 receives a message including the codec (changed codec) used by UE 100, receives a message including information indicating that UE 100 is handed over to the CS network from MSC/MGW 1706 of UE 102, and receives the information indicating that UE 100 is handed over to the CS network, by inquiry to SCC AS/CSCF 1708, ATCF/ATGW 1702 selects a codec to be used by UE 102 on the basis of the codec to be used by UE 100.

Thus, in both terminals (UE 100 and UE 102), similarly to Embodiment 3, since the same codec is used if possible, transcoding is not performed in ATCF/ATGWs 1700 and 1702. Accordingly, according to the present embodiment, in a case where both of UE 100 and UE 102 during communication are handed over to the CS network from the PS network by eSRVCC, it is possible to suppress transcoding to the minimum similarly to Embodiment 3.

Further, in a case where it is determined that both of UEs 100 and 102 are present in the CS network by terminal position determination section 1908, path selection section 1912 may switch the entire path of the network to a path for the CS network. Terminal position determination section 1908 may determine whether both terminals correspond to rSRVCC, for example, as a determination method. That is, in a case where both terminals (UB 100 and UE 102) do not correspond to rSRVCC, path selection section 1912 may switch the path of the network to the path for the CS network. The method of determining whether both terminals correspond to rSRVCC may be realized by a method equivalent to registration of the SRVCC support or a method of determining whether both terminals are supported by SRVCC, disclosed in NPL 3.

Further, in a case where it is determined that the communication counterpart terminal (for example, UE 102 shown in FIG. 21) is subject to the SRVCC or eSRVCC handover by reception of the signaling for requesting limiting the bandwidth of the input signal to be encoded, or the like, the terminal (for example, UE 100 shown in FIG. 21) may notify MSC/MGW (for example, MSC/MGW 1706 shown in FIG. 21) on the host network side that the communication counterpart terminal (UE 100) is already subject to the SRVCC or eSRVCC handover, by signaling (ST200 or ST204 shown in FIG. 21) when the host device is subject to the eSRVCC handover. Thus, terminal position determination section 1908 of MSC/MGW 1706 determines that both terminals (UE 100 and UE 102) are handed over to the CS network, and thus, may prevent a codec supported only in the PS network from being included in the codec list of the IMS signaling (SDP offer). The notification may be included in the existing signaling transmitted from UE 102 when UE 102 is handed over to the CS network, or may be a new signaling (ST1806 shown in FIG. 21). Further, the notification may be included in a signaling transmitted to MME (not shown) before UE 102 is handed over to the CS network (for example, see NPL 4).

Further, as shown in FIG. 19, MSC/MGWs 1704 and 1706 may include the equivalent function as those of ATCF/ATGWs 1700 and 1702. In FIG. 18, in a case where the network of UE 100 does not correspond to eSRVCC, signaling analysis section 1904 of MSC/MGW 1704 analyzes signaling including a codec used in the CS network when UE 100 is handed over to the CS network, and obtains information on the codec used by UE 100 in the CS network. Then, signaling generation section 1906 of MSC/MGW 1704 generates information on the codec used by UE 100 in the CS network, and notifies the generated information to SCC AS/CSCF 1708. This notification may be included in the INVITE message. Further, in FIG. 18, in a case where the network of UE 102 does not correspond to eSRVCC, when receiving, from UE 102, signaling including the content for notifying that the codec of UE 100 that is the communication counterpart is changed, signaling analysis section 1904 of MSC/MGW 1706 detects that the codec of UE 100 that is the communication counterpart of UE 102 is changed. Then, signaling generation section 1906 of MSC/MGW 1706 generates a signaling for inquiring the codec of UE 100 to SCC AS/CSCF 1708, and transmits the generated signaling to SCC AS/CSCF 1708. If a replay signaling is received by SCC AS/CSCF 1708, signaling analysis section 1904 of MSC/MGW 1706 analyzes the reply signaling, performs codec negotiation with a node (MSC/MGW 1704 or ATCF/ATGW 1700) of UE 100 that performs transcoding on the basis of the analysis result, to select a codec. The codec negotiation may be performed between MSC/MGW 1706 and SCC AS/CSCF 1708 and between SCC AS/CSCF 1708 and the node of UE 100 where transcoding is performed (that is, may be anchored by SCC AS). Thus, in a case where one UE is handed over from the PS network to the CS network by eSRVCC and the other UE is handed over from the PS network to the CS network by SRVCC, similarly to Embodiment 3, it is possible to suppress transcoding to the minimum.

Embodiment 5

In Embodiments 1, 3 and 4, the method has been described in which in a case where MSC/MGW or ATCF/ATGW detects a change of the bandwidth of communication data on one UE during session, band limitation notification is performed to the other UE. On the other hand, in the present embodiment, a method will be described in which band information is clearly included in communication data transmitted by MSC/MGW or ATCF/ATGW or in an RIP payload header of the communication data, instead of or in addition to transmission of the bandwidth limitation notification.

For example, in Embodiment 1, in a case where the bandwidth change of UE 100 is detected in codec band width detection section 606 of MSC/MGW 300 and it is determined that the bandwidth limitation of the input signal to be encoded to UE 102 is possible and necessary in change determination section 608, the bandwidth of communication data transmitted to UE 102 from MSC/MGW 300 is also limited. Here, MSC/MGW 300 causes the changed bandwidth information to be clearly included in the communication data to be transmitted or the RTP payload header in which the communication data is stored.

In a case where the changed band information is included in the RTP payload header, a packet that includes the band information is limited to packets transmitted for a predetermined time (for example, 200 msec) after band change, or a predetermined number of packets (for example, 10 packets).

If it is detected that the band information is added to the RTP payload header for a predetermined time or longer (for example, 150 msec or longer) or of a predetermined number (for example, 5 packets or more), even in a case where the band information is not added to the RTP payload header transmitted thereafter, the reception side (UE 102) determines that the bandwidth of the stored communication data is continuously limited.

Similarly, in a case where UE 102 that receives the band limitation notification transmits the communication data with the limited band to MGW 300, the band information is added to the RTP payload header of packets transmitted for a predetermined time (for example, 200 msec) or a predetermined number of packets (for example, 10 packets). If it is detected that the band information is added to the RTP payload header for a predetermined time or longer (for example 150 msec or longer) or of a predetermined number (for example, 5 packets or mom), even in a case where the band information is not added to the RTP payload header transmitted thereafter, the reception side (MGW 300) determines that the bandwidth of the stored communication data is continuously limited.

Further, in Embodiment 2, instead of reception of the band limitation notification, the method has been described in which it is detected that the bandwidth of data is limited for a predetermined time or longer to limit the band of data to be transmitted in data analysis section 1200 of UB 102. Instead, the band change may be determined in codec mode change section 1202 using the above-described method of the present embodiment (in which the band information is added to the P payload header for the predetermined time or longer (for example, 150 msec or longer) or of the predetermined number (for example, 5 packets or more)).

Further, in Embodiment 1, 3 and 4, the band limitation notification may be included in the RTP payload header. In a case where the band limitation notification is included in the RTP payload header, a packet that includes the band limitation notification is similarly limited to packets transmitted for a predetermined time (for example, 100 msec) after it is determined that the band change notification is necessary, or a predetermined number of packets (for example, 5 packets). If it is detected that the band limitation notification is added to the RTP payload header for a predetermined time or longer (for example, 20 msec or longer) or of a predetermined number (for example, 1 packet or more), even in a case where the band limitation notification is not added to the RTP payload header transmitted thereafter, reception side (UE 102) determines that a bandwidth limitation (change) request is notified. In a case where the band limitation notification is included in the RTP payload header, the above-mentioned band information may be included together with the band limitation notification.

Thus, it is possible to clearly notify a communication counterpart of bandwidth change of transmission data even during a session.

Hereinbefore, the respective embodiments of the invention have been described.

In the above-described respective embodiments, ATCF/ATGW, MSC/MGW, and SCC AS/CSCF have been described as one node, respectively, but may be provided as separate nodes. That is, in ATCF and ATGW, in MSC and MGW, and in SCC AS and CSCF, any one or both thereof may include the above-described functions, respectively. Further, necessary information may be exchanged between ATCF and ATGW, between MSC and MGW, and between SCC AS and CSCF, respectively.

Further, in the above-described respective embodiments, in a case where both of UB 100 and UB 102 support handover (handover based on SRVCC, eSRVCC or the like) to the CS network, in session negotiation on the PS network, a codec supported in the CS network or a codec compatible with the codec supported in the CS network may be selected from the beginning.

Further, in the above-described respective embodiments, the description has mainly been made using the codec relating to voice. However, the invention is not limited thereto, and may be applied to music, sound, images or the like.

In addition, the present invention is by no means limited to the embodiments described above, and various modifications are possible.

Although the foregoing embodiments have been described for the example of hardware implementation of the present invention, the present invention can be implemented with software, in concert with hardware.

Each of the functional blocks used in the descriptions of the embodiments are realized typically by LSI (large-scale integration), which is an integrated circuit. The functional blocks may each be a separate single chip, or some or all of the functional blocks may be collectively made into a single chip. The term "LSI" is used herein but the integrated circuit may be called an IC (integrated circuit), a system LSI device, a super-LSI device, or an ultra-LSI device depending on a difference in the degree of integration.

In addition, the integrated circuit is not limited to LSI and may be implemented by a dedicated circuit or by a general-purpose processor. In addition, an FPGA (field programmable gate array), which is programmable, or a reconfigurable processor that allows reconfiguration of connections or settings of the circuit cells in LSI may be used after the production of LSI.

Additionally, in the event of emergence of technology for circuit integration that replaces LSI technology by advancements in semiconductor technology or technology derivative therefrom, such technology may be used to integrate the functional blocks. Biotechnology may be applied, for example.

The disclosures of Japanese Patent Application No. 2011-129422, filed on Jun. 9, 2011, Japanese Patent Application No. 2011-247330, filed on Nov. 11, 2011, and Japanese Patent Application No. 2012-030419, filed on Feb. 15, 2012, including the specifications, drawings, and abstracts, are incorporated herein by reference in their entirety.

INDUSTRIAL APPLICABILITY

The present invention has a function of adjusting a bandwidth or an encoding bit rate of an input signal to be encoded in a codec used by a communication counterpart in a case where a codec used by one of communication terminals in communication is changed. Thus, the present invention is thus suitable for use in suppressing degradation of quality due to transcoding.

REFERENCE SIGNS LIST 100, 102 UB
200, 202, 204, 206, 1100, 1102, 1104, 1106 Signaling
300, 1300, 1302, 1310, 1704, 1706 MSC/MGW
1120, 1700, 1702 ATCF/ATGW
600, 700, 1500, 1900 Reception section
602, 702, 1502, 1902 Transmission section
604 Codec detection section
606 Codec bandwidth detection section
608 Change determination section
610, 1506, 1906, 2002 Signaling generation section
612 Transcoding section
704 Codec negotiation section
706, 1510, 1910 Codec selection section
708 Bandwidth determination section
710, 1504, 1904 Signaling analysis section
712, 1202 Codec mode change section
1200 Data analysis section
1508, 1908 Terminal position determination section
1512, 1912 Path selection section
1708 SCC AS/CSCF
2000 Communication counterpart codec change detection section

We claim:

1. A communication terminal apparatus that supports Enhanced Voice Services (EVS) codec, comprising:
a processor;
a receiver; and
a transmitter,
wherein the processor executes instructions to
perform negotiation to use an EVS codec for communication between the communication terminal apparatus and a counterpart terminal at a start of the communication, using an IP multimedia subsystem (IMS) signaling including one of a session description protocol (SDP) offer and an SDP answer,
perform negotiation to specify one or more audio-bandwidths of input signals in Hertz (Hz) or kilohertz (kHz) for the EVS codec, and
in a communication session after the codec negotiation session,
cause the receiver to receive a signaling for changing an audio-bandwidth of an input signal to the EVS codec from a network node,
change the audio-bandwidth of the input signal to the EVS codec to another audio-bandwidth without changing the EVS codec based on the signaling, wherein the audio-bandwidth is changed independently from the encoding bit rate, and
cause the transmitter to transmit encoded data in the changed audio-bandwidth.

2. The communication terminal apparatus according to claim 1,
wherein the audio-bandwidth being changed by the signaling is a same audio-bandwidth as the counterpart terminal.

3. The communication terminal apparatus according to claim 1,
wherein the signaling for changing the audio-bandwidth of the input signal of the EVS codec is included in a real-time transport control protocol (RTCP).

4. The communication terminal apparatus according to claim 1,
wherein the signaling for changing the audio-bandwidth of the input signal of the EVS codec is included in a real-time transport protocol (RTP) payload header.

5. The communication terminal apparatus according to claim 1,
wherein the signaling for changing the audio-bandwidth of the input signal of the EVS codec is received when the codec of the counterpart terminal is changed.

6. A communication method that supports Enhanced Voice Services (EVS) codec performed by a communication terminal apparatus, including a processor, a receiver, and a transmitter, the communication method comprising:
- performing negotiation, by the processor, to use an EVS codec for communication between a communication terminal apparatus and a counterpart terminal at a start of the communication, using an IP multimedia subsystem (IMS) signaling including one of a session description protocol (SDP) offer and an SDP answer;
- performing negotiation, by the processor, to specify one or more audio-bandwidths of input signals in Hertz (Hz) or kilohertz (kHz) for the EVS codec; and
- in a communication session after the codec negotiation session, the processor
  - causing the receiver to receive a signaling for changing an audio-bandwidth of an input signal to the EVS codec from a network node,
  - changing the audio-bandwidth of the input signal to the EVS codec to another audio-bandwidth without changing the EVS codec based on the signaling, wherein the audio-bandwidth is changed independently from the encoding bit rate, and
  - causing the transmitter to transmit encoded data in the changed audio-bandwidth.

7. The communication terminal apparatus according to claim 6,
- wherein the audio-bandwidth being changed by the signaling is a same audio-bandwidth as the counterpart terminal.

8. The communication method according to claim 6,
- wherein the signaling for changing the audio-bandwidth of the input signal of the EVS codec is included in a real-time transport control protocol (RTCP).

9. The communication method according to claim 6,
- wherein the signaling for changing the audio-bandwidth of the input signal of the EVS codec is included in a real-time transport protocol (RTP) payload header.

10. The communication method according to claim 6,
- wherein the signaling for changing the audio-bandwidth of the input signal of the EVS codec is received when the codec of the counterpart terminal is changed.

11. The communication terminal apparatus according to claim 1,
- wherein the used codec is an EVS codec that does not require designation of an audio-bandwidth of the audio/speech input signal to be encoded.

12. The communication method according to claim 6,
- wherein the used codec is an EVS codec that does not require designation of an audio-bandwidth of the audio/speech input signal to be encoded.

* * * * *